United States Patent
Kurauchi et al.

(10) Patent No.: US 7,313,804 B2
(45) Date of Patent: Dec. 25, 2007

(54) BROADCAST PROGRAM TRANSMISSION/RECEPTION SYSTEM, METHOD FOR TRANSMITTING/RECEIVING BROADCAST PROGRAM, PROGRAM THAT EXEMPLIFIES THE METHOD FOR TRANSMITTING/RECEIVING BROADCAST PROGRAM, RECORDING MEDIUM THAT IS READABLE TO A COMPUTER ON WHICH THE PROGRAM IS RECORDED, PAY BROADCAST PROGRAM SITE, CM INFORMATION MANAGEMENT SITE, AND VIEWER'S TERMINAL

(75) Inventors: Nobukazu Kurauchi, Nagoya (JP); Kazuo Kajimoto, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1489 days.

(21) Appl. No.: 10/010,782

(22) Filed: Nov. 5, 2001

(65) Prior Publication Data
US 2002/0055854 A1 May 9, 2002

(30) Foreign Application Priority Data
Nov. 8, 2000 (JP) .............................. 2001-340005
Jun. 1, 2001 (JP) .............................. 2001-166613

(51) Int. Cl.
H04N 7/10 (2006.01)
H04N 7/025 (2006.01)

(52) U.S. Cl. .............................. 725/32; 725/1; 725/86; 725/91; 705/27

(58) Field of Classification Search ................ 709/203, 709/217–219; 725/32, 36, 42, 109, 110, 725/114–118, 143–148, 86–87, 1, 8, 91, 103; 705/14, 26–27, 400
See application file for complete search history.

(56) References Cited

U.S. PATENT DOCUMENTS

| 5,515,098 | A | | 5/1996 | Carles |
| 5,559,549 | A | | 9/1996 | Hendricks et al. |
| 5,819,092 | A | | 10/1998 | Ferguson et al. |
| 5,855,008 | A | | 12/1998 | Goldhaber et al. |
| 5,956,716 | A | * | 9/1999 | Kenner et al. ................. 707/10 |
| 6,314,573 | B1 | * | 11/2001 | Gordon et al. ................. 725/61 |
| 6,718,551 | B1 | * | 4/2004 | Swix et al. .................... 725/32 |
| 7,159,235 | B2 | * | 1/2007 | Son et al. ...................... 725/91 |

FOREIGN PATENT DOCUMENTS

| EP | 753949 | 1/1997 |
| EP | 1058429 | 12/2000 |
| JP | 918850 | 1/1997 |
| JP | 918853 | 1/1997 |
| JP | 09-051522 | 2/1997 |

(Continued)

*Primary Examiner*—Ngoc Vu

(57) ABSTRACT

The broadcast program transmission/reception system includes a pay broadcast program site containing pay broadcast programs, multiple CM information management sites each of which stores multiple commercials, multiple viewer's terminals, and a commercial sponsor site. The viewer's terminal requests a pay broadcast program list from one of the CM information sites and then a pay broadcast program among the pay broadcast program list. The CM information management site requests the pay broadcast program requested by the viewer's terminal from the pay broadcast program site, and receives the pay broadcast program. After that, the CM information management site edits the received pay broadcast program by inserting commercials therein and transmits the pay broadcast program with commercials to the viewer's terminal. Concurrently, the CM information management site accumulates the number of transmitted pay broadcast program/commercials. In accordance with the number of transmission, usage charges/advertisement fees for pay broadcast programs/commercials are calculated.

26 Claims, 17 Drawing Sheets

FOREIGN PATENT DOCUMENTS

| | | |
|---|---|---|
| JP | 09-065321 | 3/1997 |
| JP | 10-290443 | 10/1998 |
| JP | 11-512903 | 2/1999 |
| JP | 2000188616 | 7/2000 |
| WO | 97/12486 | 4/1997 |
| WO | 99/66719 | 12/1999 |

* cited by examiner

FIG.4

401 HEADER INFORMATION

| PROGRAM TITLE (402) | THE NUMBER OF PROGRAMS/COMMERCIALS (403) |
|---|---|
| MOVIE 1 | 1 |
| CM 1 | 7 |
| CM 2 | 4 |

FIG.5

USAGE CHARGE/ADVERTISEMENT FEE LIST 501

| PROGRAM TITLE 502 | THE NUMBER OF PROVISION FOR VIEWER'S TERMINAL 503 | CHARGE FOR ONE PROVISION 504 | TOTAL OF USAGE CHARGE/ ADVERTISEMENT FEE 505 |
|---|---|---|---|
| MOVIE 1 | 125 | ¥1,000 | ¥125,000 |
| MOVIE 2 | 29 | ¥1,200 | ¥34,800 |
| CM 1 | 1,049 | ¥100 | ¥104,900 |
| CM 2 | 703 | ¥100 | ¥70,300 |

FIG.6

VIEWER'S TERMINAL MANAGEMENT TABLE 601

| VIEWER'S TERMINAL ID 602 | PROGRAM TITLE 603 | TOTAL CHARGE 604 |
|---|---|---|
| 0001 | MOVIE 1, MOVIE 2 | 350 |
| 0002 | MOVIE 1 | 150 |
| ⋮ | ⋮ | ⋮ |

FIG.10

CM SELECTION RATE TABLE 1001

| CM TITLE | THE NUMBER OF CM TRANSMISSION | CM SELECTION RATE | BREAKDOWN OF VIEWERS | BREAKDOWN OF PAY BROADCAST PROGRAM |
|---|---|---|---|---|
| CM 1 | 57 | 6.87% | | |
| CM 2 | 65 | 7.83% | | |
| CM 3 | 98 | 11.81% | | |
| CM 4 | 379 | 45.66% | | |
| CM 5 | 231 | 27.83% | | |

FIG.12

ADVERTISEMENT FEE LEST 1201

| CM TITLE | THE NUMBER OF PROVISION FOR VIEWER'S TERMINAL | FEE FOR ONE POINT | BASE DPOINT10 | ADVERTI- SEMENT FEE |
|---|---|---|---|---|
| CM 1 | 57 | ¥100 | 10 | ¥57,000 |
| CM 2 | 65 | | 20 | ¥130,000 |

AUTHENTICATION LICENSING INFORMATION 1501

| SITE ID | PASSWORD | DELIVERY FORM | DESTINATION | PAY BROADCAST PROGRAM TITLE | CM TITLE | CM CATEGORY |
|---|---|---|---|---|---|---|
| 101 | ***** | CELLULAR PHONE | ×××  | MOVIE 1 | CM1 | car |
| | | | | | CM2 | food |
| | | | | | CM3 | non-alchol |
| | | THE INTERNET | ××× | MOVIE 2 | any | any |
| 201 | ***** | BROADCASTING WAVE | ××× | MOVIE 3 | CM3 | non-alchol |
| | | | | | CM4 | ANIMATION |

AUTHENTICATION INFORMATION 1601

| SITE ID | PASSWORD | DELIVERY FORM | DESTINATION | PAY BROADCAST PROGRAM TITLE | CM TITLE | CM CATEGORY |
|---|---|---|---|---|---|---|
| 101 | ***** | CELLULAR PHONE | ××× | MOVIE 1 | CM1 | car |
| | | | | | CM2 | food |

1602　1603　1604　1605　1606　1607　1608

BROADCAST PROGRAM TRANSMISSION/RECEPTION SYSTEM, METHOD FOR TRANSMITTING/RECEIVING BROADCAST PROGRAM, PROGRAM THAT EXEMPLIFIES THE METHOD FOR TRANSMITTING/RECEIVING BROADCAST PROGRAM, RECORDING MEDIUM THAT IS READABLE TO A COMPUTER ON WHICH THE PROGRAM IS RECORDED, PAY BROADCAST PROGRAM SITE, CM INFORMATION MANAGEMENT SITE, AND VIEWER'S TERMINAL

BACKGROUND OF THE INVENTION (1) Field of the Invention

The present invention relates to a broadcast program transmission/reception system for providing broadcast programs including video and music programs.

(2) Description of the Related Art

Recently, in addition to existing ground wave broadcasting, various broadcasting methods using communications satellites, broadcasting satellites, community antenna televisions (CATV), the Internet have become available.

FIG. 1 is a schematic diagram of a conventional system for providing pay broadcast programs inexpensively to viewers. This system consists of a pay broadcast program site 101, a commercial sponsor site 102, and a viewer's terminal 103.

The pay broadcast program site 101 contains pay broadcast programs relating to movies, sports, news, music, and the like. The pay broadcast program site 101 broadcasts pay broadcast programs into which commercials contained in the commercial sponsor site 102 are inserted, as the viewer's terminal 103 requests.

The commercial sponsor site 102 pays an advertisement fee to the pay broadcast program site 101 for the commercials inserted into the pay broadcast program.

The viewer's terminal 103 designates a broadcast program title to request a pay broadcast program with commercials from the pay broadcast program site 101, and receives and reproduces the broadcast program. Then, the viewer's terminal 103 pays a charge for the broadcast program to the pay broadcast program site 101. In this case, the charge has been deducted by the insertion of commercials.

In such a system, the viewer's terminal 103 issues a request for a pay broadcast program to the pay broadcast program site 101 via the Internet, while the pay broadcast program site 101 transmits the pay broadcast program with commercials to the viewer's terminal via broadcasting satellites, for one example.

However, in the case of a popular pay broadcast program, the number of viewer's terminals that request the broadcast program would be enormously large, so that requests for the broadcast program would become in confusion on the Internet which uses public communication line.

Meanwhile, in terms of copyright protection of pay broadcast programs, the pay broadcast program site 101 has to protect against the illegal use of pay broadcast programs with commercials.

SUMMARY OF THE INVENTION

In view of the above-stated problems, the first object of the present invention is to provide a broadcast program transmission/reception system that prevents concentration and confusion in requests for a pay broadcast program by viewer's terminals 103.

The second object of the invention is to provide a broadcast program transmission/reception system that protects copyright of pay broadcast programs owned by the pay broadcast program site 101.

The above first object can be fulfilled by a broadcast program transmission/reception system that inserts one or more commercials into a pay broadcast program and transmits the pay broadcast program with one or more commercials to one of a plurality of viewer's terminals, the broadcast program transmission/reception system (hereafter called system A) is made up of: a pay broadcast program site for providing pay broadcast programs; a plurality of commercial information management sites, each of which presents a list of the pay broadcast programs to a viewer's terminal as requested by the viewer's terminal, receives a pay broadcast program designated by the viewer's terminal from the pay broadcast program site, and transmits the pay broadcast program with one or more commercials to the viewer's terminal; and the plurality of viewer's terminals, each of which requests the list of the pay broadcast programs from any one of the plurality of commercial information management sites, requests a pay broadcast program included in the list of the pay broadcast programs from the commercial information management site, and receives and reproduces the pay broadcast program with one or more commercials.

With this construction, requests for pay broadcast programs can be favorably distributed among a plurality of commercial information management sites (hereafter abbreviated as CM information management sites). As a result, confusion in requests for the pay broadcast program can be prevented, and each CM information management site can favorably transmit pay broadcast programs with commercials to the viewer's terminal.

In the above construction, each of the plurality of commercial information management sites may include: a pay broadcast program list storage unit for storing a pay broadcast program list on which pay broadcast program identifiers are listed; a commercial storage unit for storing a plurality of commercials; a pay broadcast program list transmission unit for, when receiving a transmission request for the pay broadcast program list from a viewer's terminal, reading the list from the pay broadcast program list storage unit, and transmitting the list to the viewer's terminal; a transmission request reception unit for receiving a transmission request for a pay broadcast program from a viewer's terminal, the transmission request including a pay broadcast program identifier included in the pay broadcast program list and corresponding to the requested pay broadcast program; a pay broadcast program transmission requesting unit for issuing a transmission request for the pay broadcast program in accordance with the transmission request issued by the viewer's terminal to the pay broadcast program site; a reception unit for receiving the pay broadcast program from the pay broadcast program site; an edit unit for reading one or more commercials from the commercial storage unit and edit the pay broadcast program by inserting the commercials therein to produce a pay broadcast program with commercials; a transmission unit for transmitting the pay broadcast program with commercials to the viewer's terminal that has requested the pay broadcast program; and a transmission counting unit for accumulating the number of pay broadcast programs/commercials that have been transmitted to the viewer's terminals for each pay broadcast program/commercial. Hereafter, the system having this construction will be called system B.

With this construction, the CM information management site that delivers the pay broadcast program with commercials to the viewer's terminals can keep track of the number of pay broadcast programs and commercials that have been provided for the viewer's terminals.

In the above construction, each of the commercial information management sites may further include: a commercial list storage unit for storing a commercial list on which identifiers of available commercials stored in the commercial storage unit are listed, wherein the pay broadcast program list transmission unit reads the commercial list from the commercial list storage unit as well as the pay broadcast program list, and transmits both of the lists to the viewer' terminal that has requested the program list, the transmission request reception unit receives identifiers of commercials selected from the commercial list by the viewer's terminal, as well as the pay broadcast program identifier, and the edit unit reads commercials corresponding to the identifiers of the selected commercials from the commercial storage unit to edit a pay broadcast program with commercials, each of the viewer's terminals may include: a pay broadcast program list requesting unit for requesting a pay broadcast program list from a commercial information management site; a list reception unit for receiving the pay broadcast program list and a commercial list from the commercial information management site; a display control unit for displaying, on a monitor, a broadcast program selection screen on which a plurality of titles of pay broadcast programs are listed according to the content of the program list, and after a viewer selects a pay broadcast program title, displaying, on the monitor, a commercial selection screen on which a plurality of identifiers of commercials are listed according to the content of the commercial list; a transmission request transmission unit for transmitting a transmission request for the pay broadcast program, the transmission request including the title of the selected pay broadcast program and the identifiers of the selected commercials; a reception unit for receiving the pay broadcast program with commercials; and a reproduction unit for reproducing the pay broadcast program with commercials received by the reception unit. Hereafter, the system having this construction will be called system C.

With this construction, viewers can select favorite commercials to be inserted into a pay broadcast program and enjoy the commercials while receiving discount on the charge for the pay broadcast program.

In the above construction, the commercial list storage unit in the commercial information management site may further store predetermined points set for each commercial identifier, the points for a commercial identifier are given to the viewer's terminal that selects a commercial corresponding to the commercial identifier, and the display control unit in the viewer's terminal may display predetermined points corresponding to each commercial identifier displayed on the commercial selection screen, wherein each of the viewer's terminals may further include: a commercial selection reception unit for receiving a selection of a commercial identifier among the plurality of commercial identifiers displayed on the monitor; and a transmission request permission unit for, every time a commercial identifier is selected, accumulating total points by adding corresponding predetermined points to a current total points, and when the total points becomes predetermined value or more, permitting a transmission request of the pay broadcast program to be issued.

With this construction, viewers can view pay broadcast programs inexpensively by selecting commercials so as to attain a predetermined points. Meanwhile, the commercial sponsor can promote its own commercials by setting a larger point for the commercials, and increase the advertisement effectiveness.

In the above construction, the commercial information management site may further include: an advertisement fee calculation unit for calculating an advertisement fee for a commercial based on a base fee set for one point, predetermined points corresponding to the commercial, the number of times the commercial has been transmitted.

With this construction, the commercial sponsor has to pay large amount of advertisement fees in return for getting increased advertisement effectiveness. Therefore, balanced advertisement fees can be demanded from each commercial sponsor.

In the above system C, each of the viewer's terminals may further include: a commercial selection reception unit for receiving a selection of a commercial identifier among the plurality of commercial identifiers displayed on the monitor; and a transmission request permission unit for, when a predetermined number of the commercial identifiers has been selected, permitting a transmission request of the pay broadcast program to be issued.

With this construction, viewers can view the pay broadcast program inexpensively by selecting a predetermined number of favorite commercials.

In the above system C, the commercial list storage unit in the commercial information management site may further store added information for each commercial identifier, the added information indicating the content of a commercial corresponding to the commercial identifier, and the display control unit in the viewer's terminal may display the added information corresponding to each commercial identifier on the commercial selection screen.

With this construction, viewers can guess the contents of commercials to select the commercials.

In the above system C, each of the commercial information management site may further include: a commercial selection rate calculation unit for calculating a selection rate of each commercial selected among all of the commercials, based on the identifiers of the selected commercials received by the transmission request reception unit, the commercial selection rate being provided for a commercial sponsor that provides the commercial.

With this construction, the commercial sponsor can understand trends in users' demands for commercials for referential information on the commercial production.

In the above system B, the pay broadcast program list transmission unit in each of the commercial information management sites may include: a request distribution unit for, when the number of transmission requests for the pay broadcast program list received from each of the viewer's terminals becomes a predetermined number or more, transmitting identifying information on another commercial information management site instead of the pay broadcast program list to the viewer's terminal that has requested the pay broadcast program list, wherein the viewer's terminal that receives the identifying information on the other commercial information management site issues a transmission request for the pay broadcast program list to the commercial information management site identified with the received identifying information.

With this construction, requests for a pay broadcast program can be securely distributed among the plurality of sites, which prevents the confusion in the requests.

In the above system B, each of the commercial information management site may further include: a usage charge/advertisement fee calculation unit for calculating a usage charge for a pay broadcast program based on a usage charge for one transmission of a pay broadcast program and the number of transmission of the pay broadcast program and calculating an advertisement fee for a commercial based on an advertisement fee for one transmission of a commercial and the number of transmission of the commercial.

With this construction, usage charges for the pay broadcast programs/advertisement fees for commercials can be calculated according to the number of transmitted pay broadcast programs/commercials, so that the copyright of the pay broadcast programs can be protected, while balanced advertisement fees can be demanded from each commercial sponsor.

In the above system B, the edit unit in each of the commercial information management site may include: a header information generation unit for generating identifying information on the pay broadcast program and identifying information on each commercial inserted into the pay broadcast program and the number of commercials inserted into the pay broadcast program as header information on the pay broadcast program with commercials, the transmission counting unit in each of the commercial information management site may include: a header information reading unit for reading the header information on the pay broadcast program with commercials transmitted by the transmission unit; and an accumulation unit for accumulating the number of pay broadcast programs and the commercials for each piece of header information.

With this construction, the number of pay broadcast programs/commercials transmitted to the viewer's terminal can be easily calculated.

The second object of the invention can be fulfilled by the system wherein the pay broadcast program site includes: an authentication licensing information storage unit for storing authentication licensing information consisting of a plurality of pieces of authentication information, each piece of authentication information is used for judging whether or not to transmit a pay broadcast program to a commercial information management site; an authentication information reception unit for receiving a piece of authentication information from the commercial information management site; and a judgement unit for judging whether the received authentication information complies with any one piece of authentication information stored in the authentication licensing information storage unit, and when the received authentication information complies with one piece of authentication information, permitting the pay broadcast program to be provided for the commercial information management unit, but when the received authentication information does not comply with any pieces of authentication information, refusing the pay broadcast program to be provided for the commercial information management site, each of the commercial information management sites includes: an authentication information transmission unit for transmitting a piece of authentication information including a title of a pay broadcast program to the pay broadcast program site; a reception unit for receiving an authentication licensing notification and a pay broadcast program from the pay broadcast program site, or receiving an authentication refusal notification from the pay broadcast program site; a pay broadcast program storage unit for storing the pay broadcast program received by the reception unit; an edit unit for editing the pay broadcast program by inserting commercials therein to generate a pay broadcast program with commercials; and a pay broadcast program with commercials transmission unit for transmitting the pay broadcast program with commercials to the viewer's terminal that has requested the pay broadcast program. Hereafter the system with this construction will be called system D.

With this construction, the pay broadcast program site which owns the copyright of the pay broadcast program can prevent provision of the pay broadcast program for illegal CM information management sites.

In the above system D, each of the commercial information management sites may further include: a deletion unit for deleting the pay broadcast program and the pay broadcast program with commercials stored in the pay broadcast program storage unit, immediately after the pay broadcast program with commercials transmission unit transmits the pay broadcast program with commercials to the viewer's terminal.

With this construction, pay broadcast programs which are not requested are not stored in the CM information management site, which prevents illegal usage of pay broadcast programs/pay broadcast programs with commercials.

In the above system D, each piece of authentication information stored in the authentication licensing information storage unit may include a delivery form, and the judgement unit may judge whether the received authentication information complies with any one piece of authentication information stored in the authentication licensing information storage unit based on the delivery form.

With this construction, the delivery form can be determined according to types of the viewer's terminal. Consequently, the provision of the pay broadcast program can be refused depending on the type of the viewer's terminal.

In the above system D, each piece of authentication information may include a delivery form, the delivery form is defined by a type of each viewer's terminal, and the pay broadcast program with commercials transmission unit may transmit the pay broadcast program with commercials to the viewer's terminal that has requested the pay broadcast program according to the delivery form specified for the viewer's terminal.

With this construction, the pay broadcast program with commercials can be transmitted in the delivery form according to the type of the viewer's terminal.

In the above system D, each piece of authentication information stored in the authentication licensing information storage unit may include destination information, the destination information including information on a area including a destination of the pay broadcast program and/or information on a viewer, and the judgement unit may judge whether the received authentication information complies with any one piece of authentication information stored in the authentication licensing information storage unit based on the destination information.

With this construction, the provision of the pay broadcast program can be approved depending on the region where the viewer's terminal is located or the user who uses the viewer's terminal.

In the above system D, each piece of authentication information stored in the authentication licensing information storage unit may include one of an identifier and a category of each commercial to be inserted into the pay broadcast program, and the judgement unit may judge whether the received authentication information complies with any one piece of authentication information stored in the authentication licensing information storage unit based on one of the identifier and the category.

With this construction, the provision of the pay broadcast program is approved only when commercials suitable for the pay broadcast program are inserted. Conversely, when a commercial not suitable for the pay broadcast program is inserted, the provision of the pay broadcast program can be refused.

Moreover, the first object of the invention can be fulfilled by a method for transmitting/receiving a broadcast program by which commercials are inserted into a pay broadcast program to produce a pay broadcast program with commercials and the pay broadcast program with commercials is transmitted to one of a plurality of viewer's terminal, the method comprising the steps of: receiving a transmission request for a pay broadcast program list from the viewer's terminal, the list includes titles of pay broadcast programs thereon; transmitting the pay broadcast program list to the viewer's terminal; receiving a request for a pay broadcast program whose title is listed on the pay broadcast program list from the viewer's terminal; transmitting a request for the requested pay broadcast program to a pay broadcast program site; receiving the pay broadcast program from the pay broadcast program site; inserting one or more stored commercials into the received pay broadcast program to produce a pay broadcast program with commercials; and transmitting the pay broadcast program with commercials to the viewer's terminal.

According to this method, requests for pay broadcast programs can be favorably distributed among a plurality of CM information management sites. As a result, confusion in requests for the pay broadcast program can be prevented, and each CM information management site can favorably transmit pay broadcast programs with commercials to the viewer's terminals.

In the above method, the transmitting step of the pay broadcast program list may include transmitting a commercial list on which identifiers of commercials to be inserted into the pay broadcast program and points corresponding to each commercial identifier are listed, together with the pay broadcast program list, the points being given to the viewer's terminal when the viewer's terminal selecting a commercial, the receiving step of the request for the pay broadcast program may include receiving identifiers of selected commercials together with the request for the pay broadcast program request, the inserting step of commercials may insert commercials identified with the selected commercial identifiers into the pay broadcast program, wherein the method may include the further steps of: accumulating the number of transmitted commercials for each commercial; calculating an advertisement fee for a commercial based on a base fee set for one point, predetermined points corresponding to the commercial, the number of times the commercial has been transmitted.

According to this method, the commercial sponsor can promote its own commercials by setting a larger point for the commercials. In return, the commercial sponsor pays large amount of advertisement fees.

In the above method, the transmitting step of the pay broadcast program list may include transmitting a commercial list on which identifiers of commercials to be inserted into the pay broadcast program are listed, together with the pay broadcast program list, the receiving step of the request for the pay broadcast program may include receiving identifiers of selected commercials together with the request for the pay broadcast program request, the inserting step of commercials may insert commercials identified with selected commercial identifiers into the pay broadcast program, wherein the method may include the further steps of: accumulating the number of transmitted commercials for each commercial; and calculating a commercial selection rate for each commercial selected among all of the commercials, based on the identifiers of the selected commercials received in the receiving step of the request for the pay broadcast program, the commercial selection rate being provided for a commercial sponsor that provides the commercial.

According to this method, the commercial sponsor can understand trends in users' demands for commercial by the CM selection rate.

In the above method, the transmitting step of the request for the pay broadcast program may include transmitting authentication information containing the request for the pay broadcast program, the authentication information including a delivery form defined by a type of the viewer's terminal, the receiving step of the pay broadcast program may include receiving an authentication licensing notification together with the pay broadcast program when the pay broadcast program site gives a license, and the transmitting step of the pay broadcast program with commercials may transmit the pay broadcast program with commercials to the viewer's terminal according to the delivery form specified for the viewer's terminal.

According to this method, the pay broadcast program site can judge whether the provision of the pay broadcast program should be allowed or not in accordance with the type of the viewer's terminal, and the CM information management site can transmit the pay broadcast program with commercials in the appropriate delivery form.

In addition, the first object of the invention can be fulfilled by a computer program that makes a computer execute a method for transmitting/receiving broadcast programs by which a pay broadcast program with commercials is transmitted to one of a plurality of viewer's terminals, the computer program has the computer conduct the steps of: receiving a transmission request for a pay broadcast program list from the viewer's terminal, the list includes titles of pay broadcast programs thereon; transmitting the pay broadcast program list to the viewer's terminal; receiving a request for a pay broadcast program whose title is listed on the pay broadcast program list from the viewer's terminal; transmitting a request for the requested pay broadcast program to a pay broadcast program site; receiving the pay broadcast program from the pay broadcast program site; inserting one or more stored commercials into the received pay broadcast program to produce a pay broadcast program with commercials; and transmitting the pay broadcast program with commercials to the viewer's terminal.

Similarly, the first object of the invention can be fulfilled by a recording medium that is readable for a computer, the recording medium recording a computer program that makes the computer execute a method for transmitting/receiving broadcast programs by which a pay broadcast program with commercials is transmitted to one of a plurality of viewer's terminals, the computer program embodied on the recording medium has the computer conduct the steps of: receiving a transmission request for a pay broadcast program list from the viewer's terminal, the list includes titles of pay broadcast programs thereon; transmitting the pay broadcast program list to the viewer's terminal; receiving a request for a pay broadcast program whose title is listed on the pay broadcast program list from the viewer's terminal; transmitting a request for the requested pay broadcast program to a pay broadcast program site; receiving the pay broadcast program from the pay broadcast program site; inserting one or more stored commercials into the received pay broadcast program to produce a pay broadcast program with commercials; and transmitting the pay broadcast program with commercials to the viewer's terminal.

With these constructions, requests for pay broadcast programs can be favorably distributed among a plurality of CM information management sites. As a result, confusion in requests for the pay broadcast program can be prevented, and each CM information management site can favorably transmit pay broadcast programs with commercials to the viewer's terminals.

Also, the second object of the invention can be fulfilled by a pay broadcast program site that is connected to a plurality of commercial information management sites via a network, each of the plurality of commercial information management sites inserting commercials into a pay broadcast program to produce a pay broadcast program and transmitting the pay broadcast program with commercials to one of a plurality of viewer's terminals, the pay broadcast program site made up of: an authentication licensing information storage unit for storing authentication licensing information consisting of a plurality of pieces of authentication information, each piece of authentication information is used for judging whether or not to transmit a pay broadcast program to a commercial information management site and includes a delivery form that is defined by a type of a viewer's terminal; an authentication information reception unit for receiving a piece of authentication information from the commercial information management site; a judgement unit for judging whether the received authentication information complies with any one piece of authentication information stored in the authentication licensing information storage unit, and when the received authentication information complies with one piece of authentication information, permitting the pay broadcast program to be provided for the commercial information management unit, but when the received authentication information does not comply with any pieces of authentication information, refusing the pay broadcast program to be provided for the commercial information management site, the delivery form being utilized for the judgement; a pay broadcast program storage unit for storing pay broadcast programs; a pay broadcast program transmission unit for, when the judgement means permits the transmission, reading the requested broadcast program from the pay broadcast program storage unit, and transmitting the pay broadcast program together with an authentication licensing notification to the commercial information management site that has requested the pay broadcast program.

This construction prevents the illegal usage of the pay broadcast program.

Further, the first object of the invention can be fulfilled by a commercial information management site that is connected to a pay broadcast program site and a plurality of viewer's terminals via a network, the commercial information management site made up of: a pay broadcast program list storage unit for storing a pay broadcast program list on which pay broadcast program identifiers are listed; a commercial storage unit for storing a plurality of commercials; a pay broadcast program list transmission request reception unit for receiving a transmission request for a pay broadcast program list from each of the plurality of viewer's terminals; a pay broadcast program list transmission unit for, when receiving a transmission request for the pay broadcast program list from a viewer's terminal, reading the list from the pay broadcast program list storage unit, and transmitting the list to the viewer's terminal; a transmission request reception unit for receiving a transmission request for a pay broadcast program from a viewer's terminal, the transmission request including a pay broadcast program identifier included in the pay broadcast program list and corresponding to the requested pay broadcast program; a pay broadcast program transmission requesting unit for issuing a transmission request for the pay broadcast program in accordance with the transmission request issued by the viewer's terminal to the pay broadcast program site; a reception unit for receiving the pay broadcast program from the pay broadcast program site; an edit unit for reading one or more commercials from the commercial storage unit and edit the pay broadcast program by inserting the commercials therein to produce the pay broadcast program with commercials; a transmission unit for transmitting the pay broadcast program with commercials to the viewer's terminal that has requested the pay broadcast program; and a transmission counting unit for accumulating the number of pay broadcast programs/commercials that have been transmitted to the viewer's terminals for each pay broadcast program/commercial. Hereafter, the CM information management site with this construction will be called the CM information management site A.

This construction prevents requests for the pay broadcast program from unfavorably concentrating in one CM information management site.

The above site A may be further made up of: a commercial list storage unit for storing a commercial list on which identifiers of available commercials stored in the commercial storage unit and points that are given to the viewer's terminal when selecting a commercial are listed, wherein the pay broadcast program list transmission unit reads the commercial list from the commercial list storage unit as well as the pay broadcast program list, and transmits both of the lists to the viewer' terminal that has requested the program list, the transmission request reception unit receives identifiers of commercials selected from the commercial list by the viewer's terminal, as well as the pay broadcast program identifier, and the edit unit reads commercials corresponding to the identifiers of the selected commercials from the commercial storage unit to edit a pay broadcast program with commercials, wherein the commercial information management site further includes: an advertisement fee calculation unit for calculating an advertisement fee for a commercial based on a base fee set for one point, predetermined points corresponding to the commercial, the number of times the commercial has been transmitted.

With this construction, balanced advertisement fees can be demanded from each commercial sponsor.

The above site A may be further made up of: a commercial list storage unit for storing a commercial list on which identifiers of available commercials stored in the commercial storage unit are listed, wherein the pay broadcast program list transmission unit reads the commercial list from the commercial list storage unit as well as the pay broadcast program list, and transmits both of the lists to the viewer' terminal that has requested the program list, the transmission request reception unit receives identifiers of commercials selected from the commercials list by the viewer's terminal, as well as the pay broadcast program identifier, and the edit unit reads commercials corresponding to the identifiers of the selected commercials from the commercial storage unit to edit a pay broadcast program with commercials, wherein the commercial information management site further includes: a commercial selection rate calculation unit for calculating a selection rate of each commercial selected among all of the commercials, based on the identifiers of the selected commercials received by the transmission request reception unit, the commercial selection rate being provided for a commercial sponsor that provides the commercial.

With this construction, the commercial sponsor can understand trends in users' demands for commercials.

In the above site A, the pay broadcast program transmission requesting unit may transmit authentication information including a transmission request for the pay broadcast program, the authentication information may include a delivery form defined by a type of each viewer's terminal, the reception unit may receive an authentication licensing notification together with the pay broadcast program from the pay broadcast program site; and the transmission unit may transmit the pay broadcast program with commercials to the viewer's terminal that has requested the pay broadcast program according to the delivery form.

With this construction, the pay broadcast program with commercials can be transmitted in accordance with the type of viewer's terminal.

According to the invention, a viewer's terminal that is connected to a plurality of commercial information management sites which each receives a pay broadcast program from a pay broadcast program site and transmits the pay broadcast program into which commercials have been inserted to the viewer's terminal, the viewer's terminal made up of: a pay broadcast program list requesting unit for requesting a pay broadcast program list from one of the plurality of commercial information management sites; a list reception unit for receiving the pay broadcast program list and a commercial list from the commercial information management site or receiving identifying information on another commercial information management site from the commercial information management site; a redemanding unit for, when the list reception unit receives the identifying information on the other commercial information management site, redemanding the pay broadcast program list from the commercial information management site identified with the received identifying information; a display control unit for displaying, on a monitor, a broadcast program selection screen on which a plurality of titles of pay broadcast programs are listed according to the content of the pay broadcast program list, and after a viewer selects a pay broadcast program title, displaying, on the monitor, a commercial selection screen on which a plurality of identifiers of commercials are listed according to the content of the commercial list; a transmission request transmission unit for transmitting a transmission request for the pay broadcast program, the transmission request including the title of the selected pay broadcast program and the identifiers of the selected commercials; a reception unit for receiving the pay broadcast program with commercials; and a reproduction unit for reproducing the pay broadcast program with commercials received by the reception unit.

With this construction, viewers can view the pay broadcast program inexpensively.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows one example of header information that is attached to the pay broadcast program with commercials contained in the CM information management site in the first embodiment;

FIG. 5 shows one example of a usage charge/advertisement fee list created by the contents transmission counting unit in the first embodiment;

FIG. 6 shows one example of a viewer's terminal management table created by the contents transmission counting unit in the first embodiment;

FIG. 10 shows one example of a CM selection rate table that is created by the CM transmission counting unit in a broadcast program transmission/reception system according to the third embodiment of the invention;

FIG. 12 shows one example of an advertisement fee list that is created by the CM transmission counting unit in the broadcast program transmission/reception system according to the fifth embodiment of the invention;

FIG. 15 shows one example of authentication and licensing information stored in the authentication and licensing information server in the pay broadcast program site according to the sixth embodiment;

FIG. 16 shows one example of authentication information that is transmitted together with a transmission request for the pay broadcast program from the CM information management site in the sixth embodiment.

DESCRIPTION OF THE PREFERRED EMBODIMENT

The following describes embodiments of the broadcast program transmission/reception system according to the invention, with reference to drawings.

First Embodiment

Figure 1:
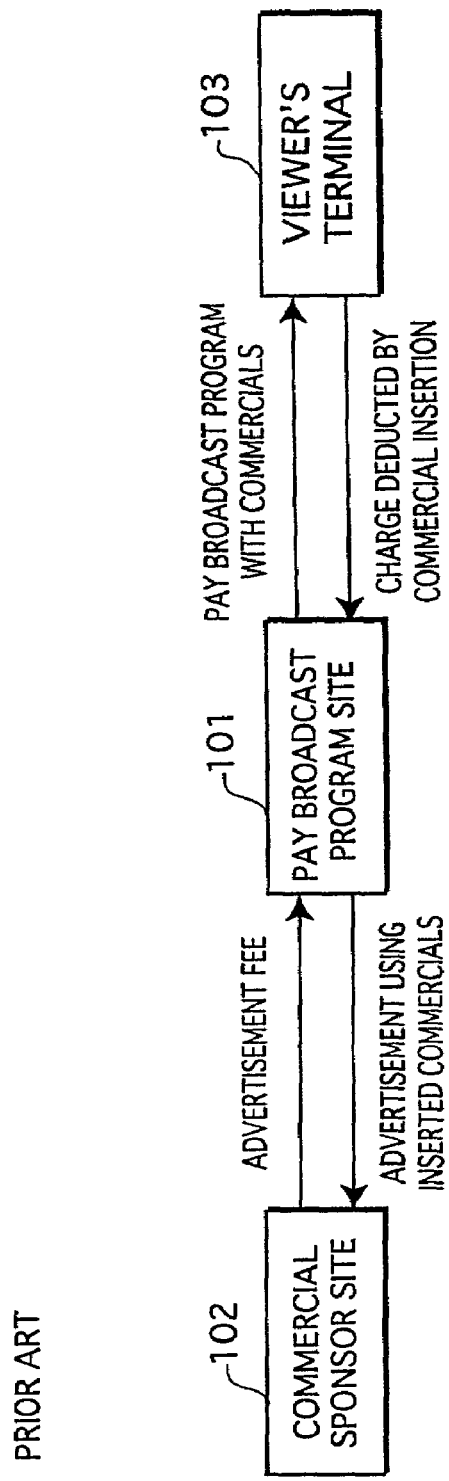
FIG. 1 is a schematic diagram of a conventional broadcast program transmission/reception system.
Figure 2:
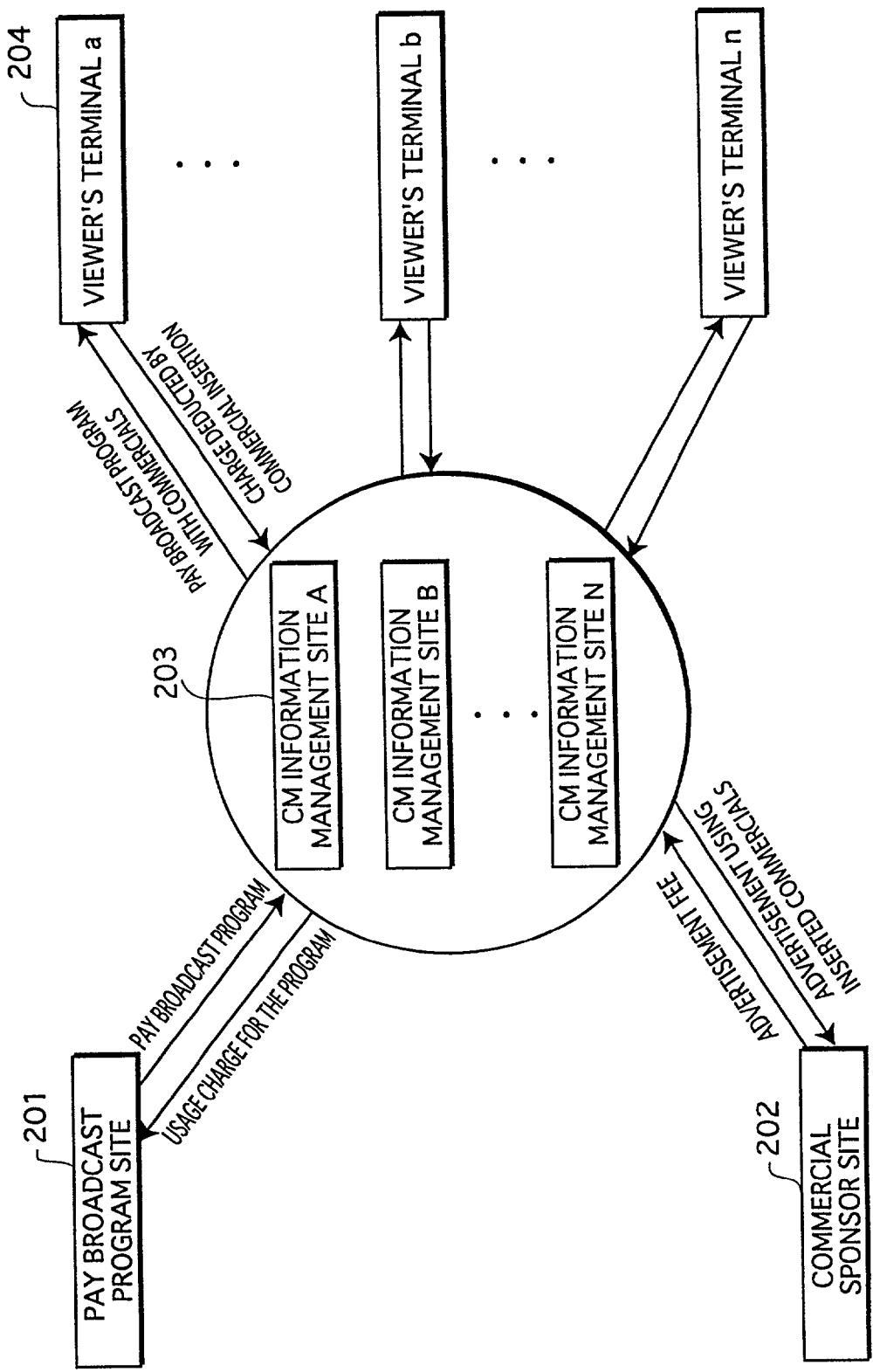
FIG. 2 is a schematic diagram of a broadcast program transmission/reception system according to the first embodiment of the invention.

FIG. 2 is a schematic diagram of a broadcast program transmission/reception system according to the first embodiment of the invention.

The broadcast program transmission/reception system consists of a pay broadcast program site 201, a commercial sponsor site 202, a plurality of CM information management sites 203, and a plurality of viewer's terminals 204.

The pay broadcast program site 201 contains pay broadcast programs relating to movies, sports, news, music, and the like, and receives usage charges for the pay broadcast programs based on the agreement in return for provision of the pay broadcast programs to each CM information management site 203.

The commercial sponsor site 202 provides its own commercials to each CM information management site 203 and pays advertisement fees to each CM information management site 203 for the advertising effectiveness obtained from the commercials delivered to viewers.

The CM information management sites 203 contain commercials provided by the commercial sponsor 202. On receiving a request for a pay broadcast program from each viewer's terminal 204, each CM information management site 203 receives the pay broadcast program from the pay broadcast program site 201 and inserts commercials into the pay broadcast program to deliver it to the viewer's terminal that requests the pay broadcast program. Then, the CM information management site 203 demands a charge for the pay broadcast program with commercials from the viewer's terminal 204, demands an advertisement fee from the commercial sponsor 202, and pays a usage charge for the pay broadcast program to the pay broadcast program site 201.

Each of the viewer's terminal 204 requests a pay broadcast program from one of the CM information management sites 203 to receive the pay broadcast program with commercials from there. Then, the viewer's terminal 204 pays a charge for the pay broadcast program discounted by the advertisement fees for the inserted commercials to the CM information management site 203.

Figure 3:
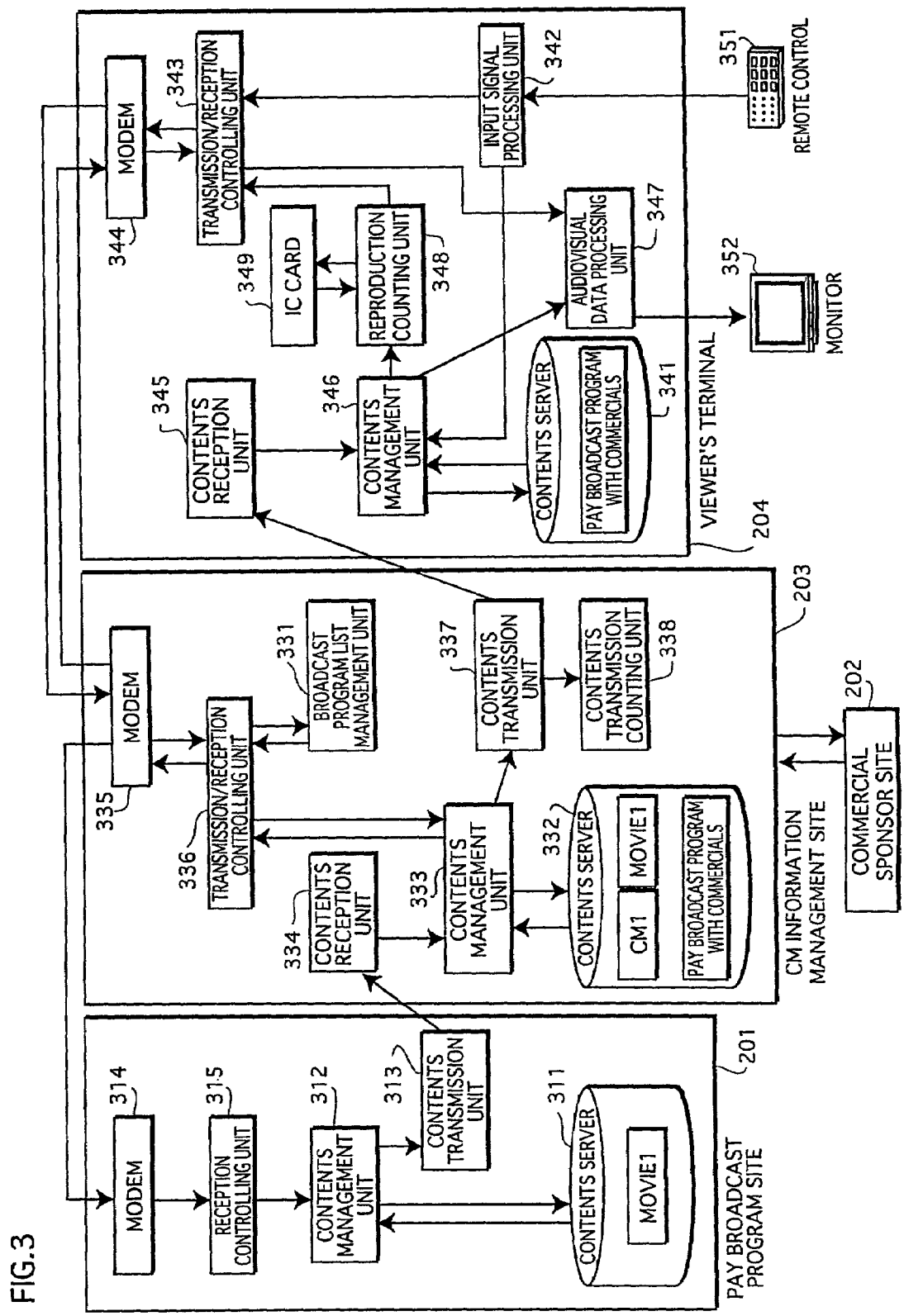
FIG. 3 shows a construction of the broadcast program transmission/reception system in the first embodiment.

Next, the following describes the details for the first embodiment with reference to FIG. 3 that shows the construction of the system.

As can been seen from FIG. 3, the broadcast program transmission/reception system includes the pay broadcast program site 201, the commercial sponsor site 202, the plurality of CM information management sites 203, and the plurality of viewer's terminals 204.

The pay broadcast program site 201 is provided with a contents server 311, a contents management unit 312, a contents transmission unit 313, a modem 314, and a reception controlling unit 315.

The contents server 311 is composed of a hard disk and the like, and stores contents of pay broadcast programs relating to movies, sports, news, music, etc. whose copyrights are possessed by the pay broadcast program site 201. In FIG. 3, the contents server 311 stores "movie 1" as the pay broadcast program, as one example.

On being notified of a transmission request from the reception controlling unit 315, the contents management unit 312 reads the contents designated by the transmission request from the contents server 311. Then, the contents management unit 312 notifies the contents transmission unit 313 of the read contents and identifying information on the CM information management site 203 which has issued the request. The identifying information is included in the received transmission request.

On receiving the notification of the identifying information on the CM information management site 203 and the read contents such as "movie 1", the contents transmission unit 313 transmits the "movie 1" to the CM information management site 203 identified with the received identifying information.

The modem 314 is connected to the plurality of CM information management sites 203 via public communication line and the like.

The reception controlling unit 315 notifies the contents management unit 312 of the transmission request received via the modem 314 from the CM information management site 203. The transmission request includes a pay broadcast program title that designates the contents of the pay broadcast program and identifying information that identifies the CM information management site 203 which has issued the request.

The commercial sponsor site 202 is connected to the CM information management sites 203 via public communication line.

Next, each of the CM information management sites 203 is provided with a broadcast program list management unit 331, a contents server 332, a contents management unit 333, a contents reception unit 334, a modem 335, a transmission/reception controlling unit 336, a contents transmission unit 337, and a contents transmission counting unit 338.

The broadcast program list management unit 331 stores a broadcast program list on which titles of pay broadcast programs available from the pay broadcast program site 201 are listed. That is, the broadcast program list management unit 331 stores the pay broadcast programs list for providing to the viewer's terminals 204.

The contents server 332 is composed of a hard disk and the like. The contents server 332 prestores a plurality of commercials to be inserted into pay broadcast programs, and further stores contents of pay broadcast programs, such as "movie 1", that has been received from the pay broadcast program site 201. In addition, the contents server 332 stores pay broadcast programs with commercials that an editor (not illustrated) has prepared by inserting the commercials into the "movie 1".

Note that the title of the pay broadcast program and the number of the inserted commercials for each commercial are recorded onto the pay broadcast program with commercials as its header information.

On being notified of a pay broadcast program acquisition request including a pay broadcast program title and identifying information on the viewer's terminal 204 by the transmission/reception controlling unit 336, the contents management unit 333 refers to the header information of the pay broadcast program with commercials to judge whether the pay broadcast program with commercials identified with the pay broadcast program title is stored in the contents server 332. In the case that the requested pay broadcast program with commercials is not stored in the contents server 332, the contents management unit 333 notifies the transmission/reception controlling unit 336 of a transmission request including the pay broadcast program title and identifying information of its own (i.e., identifies the CM information management site 203).

Alternatively, in the case that the pay broadcast program with commercials satisfying the pay broadcast program acquisition request is stored in the contents server 332, the contents management unit 333 reads the pay broadcast program with commercials together with the header information from the contents server 332 and notifies the contents transmission unit 337 of them.

Meanwhile, on receiving a notification from the contents reception unit 334 that a pay broadcast program has been received, the contents management unit 333 controls the contents server 332 to store the contents of the pay broadcast program. At the same time, the contents management unit 333 instructs the editor (not illustrated) to edit the pay broadcast program stored in the contents server 332 so as to include commercials therein.

After editing the pay broadcast program so as to include commercials therein, the editor records the pay broadcast program title and the number of commercials for each commercial onto the pay broadcast program with commercials as the header information.

On receiving the pay broadcast program, which satisfies the transmission request, from the contents transmission unit 313 in the pay broadcast program site 201, the contents reception unit 334 notifies the contents management unit 333 of the pay broadcast program.

The modem 335 is connected to the modem 314 in the pay broadcast program site 201 and the plurality of viewer's terminals 204 via public communication line. The modem 335 is connected also to the commercial sponsor site 202 via public communication line.

On receiving a reception request for a broadcast program list from one of the viewer's terminals 204, the modem 335 notifies the transmission/reception controlling unit 336 of a transmission request for the broadcast program list. The transmission request for the broadcast program list includes identifying information on the viewer's terminal 204.

On receiving a pay broadcast program acquisition request from one of the viewer's terminals 204, the modem 335 notifies the transmission/reception controlling unit 336 of the pay broadcast program acquisition request.

Then, on being notified of the broadcast program list together with the identifying information on the viewer's terminal 204 by the transmission/reception controlling unit 336, the modem 335 transmits the broadcast program list to the viewer's terminal 204 that is identified with the received identifying information.

Alternatively, on being notified of a transmission request for a pay broadcast program by the transmission/reception controlling unit 336, the modem 335 transmits the transmission request to the modem 314 in the pay broadcast program site 201.

Next, on being notified of the transmission request for the broadcast program list by the modem 335, the transmission/reception controlling unit 336 reads the broadcast program list stored in the broadcast program list management unit 331, and notifies the modem 335 of the read broadcast program list and the identifying information on the viewer's terminals 204 that is included in the transmission request.

Alternatively, on being notified of the pay broadcast program acquisition request by the modem 335, the transmission/reception controlling unit 336 notifies the contents management unit 333 of the pay broadcast program acquisition request.

In another case, on being notified of a transmission request from the contents management unit 333, the transmission/reception unit 336 notifies the modem 335 of the transmission request for the pay broadcast program.

Here, the transmission/reception controlling unit 336 in a CM information management site 203 stores Uniform Resource Locators (URLs) for other CM information management sites. These other CM information management sites may be operated by an organization belonging to the same group as the organization operating the CM information management site, or affiliated with the same. If the number of transmission requests for the broadcast program list from the modem 335 exceeds a predetermined level (e.g., 3,000), then the transmission/reception controlling unit 336 notifies the modem 335 of a URL for another CM information management site instead of transmitting the broadcast program list thereto.

Then, the modem 335 transmits this URL to the viewer's terminal that has issued the transmission request for the broadcast program list.

This construction prevents so many acquisition requests from flooding into the CM information management site 203.

The contents transmission unit 337 transmits the pay broadcast program with commercials that is notified by the contents management unit 333 to the viewer's terminal identified with the identifying information via broadcasting wave. At the same time, the contents transmission unit 337 notifies the contents transmission counting unit 338 of the header information on the pay broadcast program with commercials, in addition to the identifying information on the viewer's terminal to which the broadcast program has been transmitted.

The contents transmission counting unit 338 refers to the header information notified by the contents transmission unit 337 and counts the number of pay broadcast programs with commercials and the number of commercials for each commercial that have been transmitted to each of the viewer's terminals 204.

FIG. 4 shows one example of header information directed to the contents transmission counting unit 338, when the contents transmission unit 337 transmits a pay broadcast program with commercials to a viewer's terminal 204.

As can be seen from FIG. 4, broadcast program titles 402 and the number of videos included in the broadcast program 403 are described in the header information 401. Pay broadcast program titles and commercial titles are described in the field of the broadcast program titles 402.

The contents transmission counting unit 338 accumulates the total number of delivery for each broadcast program described in the header information to calculate the number of times the broadcast program has been delivered to the viewer's terminals.

Here, the contents transmission counting unit 338 pre-stores a usage charge for each pay broadcast program for one delivery and an advertisement fee for each commercial for one delivery. Then, the contents transmission counting unit 338 calculates the total of usage charges/advertisement fees for each pay broadcast program/commercial from the following formula (1):

Total of usage charges/advertisement fees=the number of times the broadcast program has been delivered to viewer's terminals×a charge for one delivery (1)

FIG. 5 shows one example of a list of the calculation results of the usage charges/advertisement fees.

This list 501 includes the fields of broadcast program titles 502, the number of times each broadcast program has been provided for viewer's terminal 503, charge for one provision 504, and total of usage charge/advertisement fee 505. As might be seen from this list, the total usage charge/advertisement fee 505 is calculated for each pay broadcast program/commercial that is identified with each of the broadcast program titles 502.

Note that a usage charge/an advertisement fee for one provision 504 is predetermined for each pay broadcast program/commercial by the agreement between the pay broadcast program site 201/the commercial sponsor site 202 and the CM information management site 203.

In this way, a usage charge to be paid for the pay broadcast program site 201 and an advertisement fee to be paid by the commercial sponsor site 202 are respectively calculated based on the number the pay broadcast program/commercial has been delivered to the viewer's terminal 204.

Moreover, the contents transmission counting unit 338 draws up a viewer's terminal management table on which titles of the delivered pay broadcast programs are listed for each of the viewer's terminals 204.

FIG. 6 shows one example of the viewer's terminal management table. This table 601 includes the fields of viewer's terminal ID 602, pay broadcast program title 603, and total charge 604. In the field of viewer's terminal ID 602, identifying information for identifying each viewer's terminal is listed. In the field of pay broadcast program title 603, titles of the pay broadcast programs which have been provided to the viewer's terminal identified with the identifying information are described. In the field of total charge 604, the calculated total charges for each viewer's terminal are listed. This total charges are presented to each viewer's terminal 204 by each CM information management site 203.

Next, the viewer's terminal 204 includes a contents server 341, an input signal processing unit 342, a transmission/reception controlling unit 343, a modem 344, a contents reception unit 345, a contents management unit 346, an audiovisual data processing unit 347, a reproduction counting unit 348, and an IC card 349. The input signal processing unit 342 receives signals according to the user's operation using an external remote control 351. An external monitor 352 reproduces audiovisual data and text information that are outputted from the audiovisual data processing unit 347.

Note that users may directly operate buttons or the like (not illustrated) on the input signal processing unit 342 instead of operating the remote control 351.

The contents server 341 is composed of a hard disk and the like and stores the requested pay broadcast programs with commercials therein.

The input signal processing unit 342 receives signals according to user's operation using the remote control 351.

Using the remote control 351, users can issue an acquisition request for a broadcast program list, select a pay broadcast program, issue an acquisition request for a pay broadcast program, instruct the system to reproduce the acquired pay broadcast program with commercials, and the like.

On receiving a signal of an acquisition request for a broadcast program list from the remote control 351, the input signal processing unit 342 notifies the transmission/reception controlling unit 343 of the acquisition request for the broadcast program list.

On receiving a signal for selecting a pay broadcast program from the remote control 351, the input signal processing unit 342 notifies the transmission/reception controlling unit 343 of the signal. Alternatively, on receiving a signal for acquiring a pay broadcast program, the input signal processing unit 342 notifies the transmission/reception controlling unit 343 of the acquisition request for the pay broadcast program.

On receiving a signal for reproducing a pay broadcast program with commercials from the remote control 351, the input signal processing unit 342 notifies the contents management unit 346 of a reproduction instruction.

On receiving a notification of an acquisition request for a broadcast program list from the input signal processing unit 342, the transmission/reception controlling unit 343 notifies the modem 344 of a transmission request for the broadcast program list together with identifying information for identifying itself.

On receiving a notification of the broadcast program list from the modem 344, the transmission/reception controlling unit 343 notifies the audiovisual data processing unit 347 as such.

In the case that the transmission/reception controlling unit 343 receives a notification of a URL for another CM information management site from the modem 344, the transmission/reception controlling unit 343 instructs the modem 344 to transmit a transmission request for the broadcast program list together with identifying information for identifying the viewer's terminal itself to the CM information management site specified by the URL. Then, the modem 344 transmits again the transmission request for the broadcast program list to the CM information management site.

In the above case, the transmission/reception controlling unit 343 receives a notification of one URL for another CM information management site. However, the transmission/reception controlling unit 343 may receive a notification of a list of URLs for other CM information management sites and issue a transmission request for the broadcast program list to a CM information management site that is designated by the URL selected by the viewer's terminal 204. Thereby, so many transmission requests for pay broadcast programs do not concentrate on the CM information management site 203, but they are directed to other CM information management sites.

On being notified of a signal for selecting a pay broadcast program and an acquisition request for the pay broadcast program by the input signal processing unit 342, the transmission/reception controlling unit 343 notifies the modem 344 of a transmission request including the pay broadcast program title and identifying information for identifying itself.

The modem 344 is connected to the modem 335 in the CM information management site 203 via public communication line.

On being notified of a transmission request for a broadcast program list by the transmission/reception controlling unit 343, the modem 344 transmits it to the modem 335. Then, on receiving the broadcast program list from the modem 335, the modem 344 notifies the transmission/reception controlling unit 343 of the broadcast program list.

Alternatively, on being notified of a transmission request for a pay broadcast program by the transmission/reception controlling unit 343, the modem 344 transmits it to the modem 335.

On receiving the pay broadcast program with commercial, which satisfies the transmission request, from the CM information management site 203, the contents reception unit 345 notifies the contents management unit 346 as such.

On being notified of the pay broadcast program with commercials that the contents reception unit 345 has received, the contents management unit 346 controls the contents server 341 to store it. Then, on being notified of a reproduction instruction by the input signal processing unit 342, the contents management unit 346 reads the pay broadcast program with commercials stored in the contents server 341 and notifies the audiovisual data processing unit 347 of it. When starting to reading a pay broadcast program/commercial, the contents management unit 346 notifies the reproduction counting unit 348 of the pay broadcast program/commercial title and the number of times "1".

On receiving a notification of a broadcast program list from the transmission/reception controlling unit 343, the audiovisual data processing unit 347 makes the external monitor 352 display the contents of the list.

Figure 7:
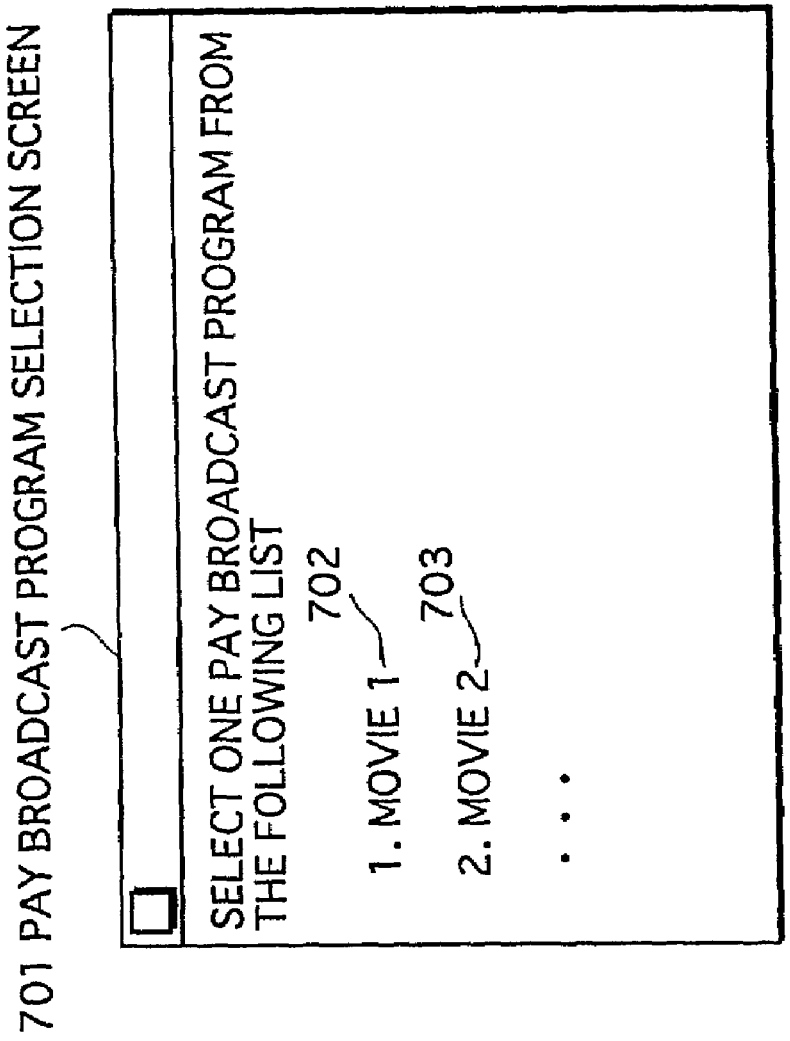
FIG. 7 shows one example of a pay broadcast program selection screen that is displayed on the monitor of the viewer's terminal in the first embodiment.

FIG. 7 shows one example of a pay broadcast program selection screen displayed on the monitor 352, which indicates the content of the broadcast program list. On the pay broadcast program selection screen 701, titles of pay broadcast programs such as 702 and 703 are displayed.

On the pay broadcast program selection screen 701, users can select a broadcast program "movie 1" 702, for example, and issue a acquisition request for the broadcast program. After that, the message that the requested pay broadcast program with commercials was able to be successfully acquired is displayed on the monitor 352, so that users can give a reproduction instruction to the system by using the remote control 351.

The audiovisual data processing unit 347 reproduces the pay broadcast program with commercials that has been notified by the contents management unit 346 to output it to the monitor 352.

On being notified of the pay broadcast program/commercial title and the number of reproduction of each pay broadcast program/commercial by the contents management unit 346, the reproduction counting unit 348 accumulates the number of reproduction for each pay broadcast program/commercial, and records the accumulated number of times onto the IC card 349. Note that, instead of recording the number of times onto the IC card 349, the CM information management site 203 may be informed of the number of reproduction every time a pay broadcast program is reproduced.

The IC card 349 is detachable from the system, onto which the number of reproduction of pay broadcast programs/commercials is recorded. Further, viewer's information such as a personal ID for the contractor and an ID for the card, a key of cryptograph for descrambling in the case that the pay broadcast program with commercial has been scrambled, and the like are stored in the IC card 349.

Figure 8:
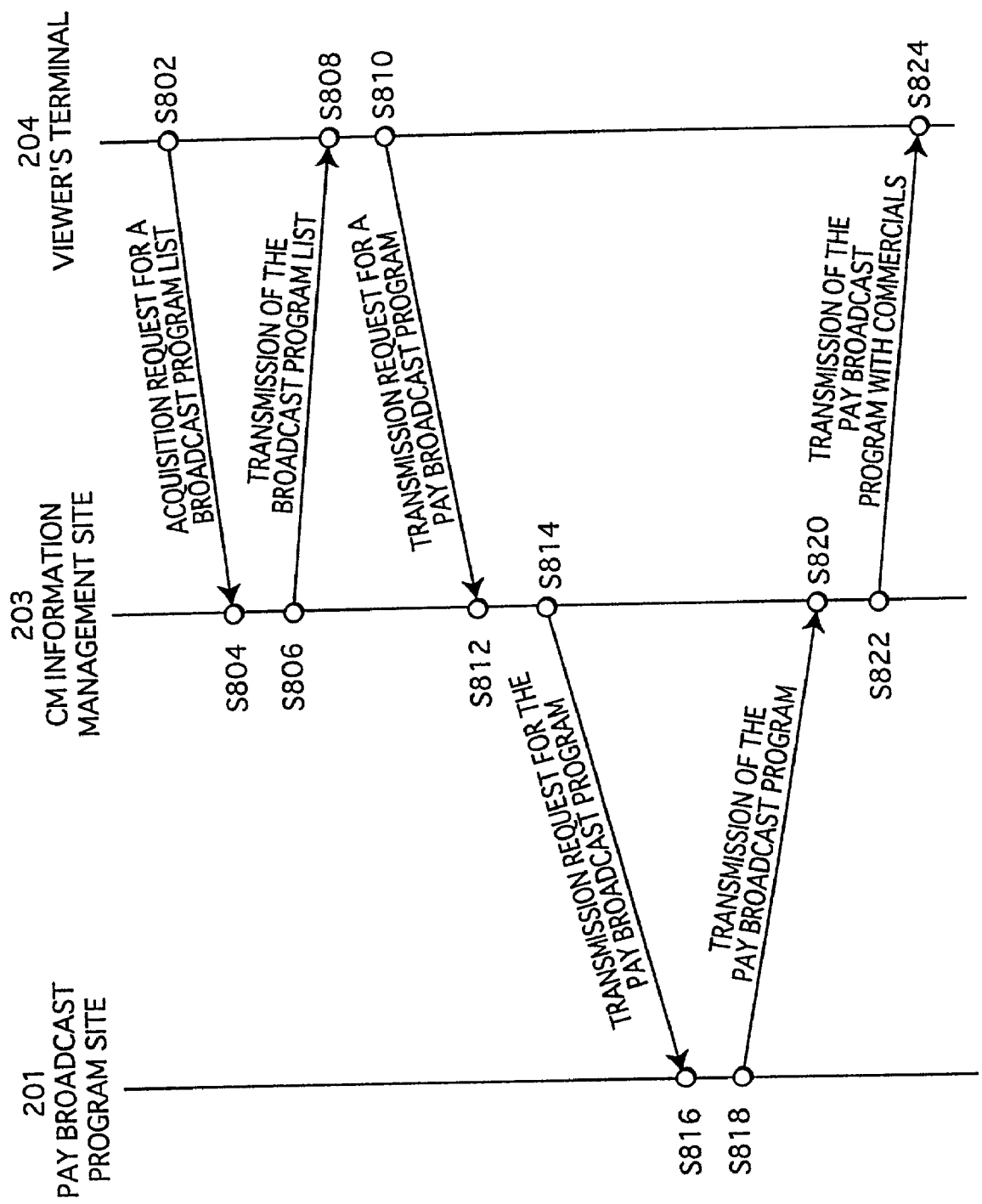
FIG. 8 shows message sequence among the pay broadcast program site, the CM information management site, and the viewer's terminal in the first embodiment.

The following describes operations among the pay broadcast program site 201, the CM information management site 203, and the viewer's terminal 204 in this embodiment, with reference to the message sequence shown in FIG. 8.

Firstly, The modem 344 in the viewer's terminal 204 issues a broadcast program list acquisition request to the modem 335 in the CM information management site 203 (s802).

At the CM information management site 203, the transmission/reception controlling unit 336 reads the broadcast program list from the broadcast program list management unit 331 (s804) and transmits it to the viewer's terminal 204 that has issued the request via the modem 335 (s806).

The viewer's terminal 204 receives the broadcast program list, makes the monitor 352 display a pay broadcast program selection screen 701 so that a user can select the pay broadcast program, and receives an instruction for selection and transmission of the broadcast program from the user (s808). On receiving the instruction from the input signal processing unit 342, the transmission/reception controlling unit 343 transmits the transmission request for the pay broadcast program to the CM information management site 203 via the modem 344 (s810).

On receiving the transmission request for the pay broadcast program, the contents management unit 333 in the CM information management site 203 judges whether the pay broadcast program into which commercials have been inserted is stored in the contents server 332 (s812). In the case that it has been stored in the contents server 332, the process goes to s822, while in the case that it has not been stored in the contents server 332, the contents management unit 333 transmits the transmission request for the pay broadcast program to the pay broadcast program site 201 via the transmission/reception controlling unit 336 and the modem 335 (s814).

On receiving the transmission request for the pay broadcast program from the CM information management site 203 (s816), the contents management unit 312 in the pay broadcast program site 201 reads the requested pay broadcast program from the contents server 311 and the contents transmission unit 313 transmits it to the CM information management site 203 (s818).

At the CM information management site 203, the contents reception unit 334 receives the requested pay broadcast program to store it in the contents server 332 via the contents management unit 333 (s820).

The pay broadcast program stored in the contents server 332 is edited so as to include commercials that have been prestored in the contents server 332.

The contents transmission unit 337 transmits the pay broadcast program with commercials read from the contents server 332 by the contents management unit 333 to the viewer's terminal 204. At the same time, the contents transmission counting unit 338 accumulates the number of transmission for each pay broadcast program/commercial to calculate a usage charge/an advertisement fee for the pay broadcast program/commercial (s822).

On receiving the pay broadcast program with commercials, the viewer's terminal 204 makes the contents server 341 store it. On receiving a reproduction instruction from a user, the contents management unit 346 reads the pay broadcast program with commercials from the contents server 341. Then, the audiovisual data processing unit 347 reproduces the read pay broadcast program with commercials to output it to the monitor 352 (s824).

Note that, in the above process, at s804, if the number of the broadcast program list acquisition requests exceeds a predetermined level, the transmission/reception controlling unit 336 does not read the broadcast program list from the broadcast program list management unit 331, but notifies the modem 335 of a URL for another CM information management site that has been prestored therein. Then, at s806, the modem 335 transmits the URL to the viewer's terminal 204 that has issued the request. Following these processes, the viewer's terminal 204 performs the procedures from s802 to the CM information management site designated by the received URL.

In this embodiment, the number of transmission of pay broadcast programs with commercials from the CM information management site 203 to the viewer's terminal 204 is used for calculating usage charges to be paid to the pay broadcast program site 201 and advertisement fees that the commercial sponsor site 202 has to pay. Instead, the number of reproduction at viewer's terminal 204 may be used for calculating the same. In the latter case, the transmission/reception controlling unit 343 reads the number of reproduction that has been stored in the IC card 349 and has been counted by the reproduction counting unit 348 in each of the viewer's terminals 204, and transmits the number to the CM information management site 203 via the modem 344. At the CM information management site 203, the contents transmission counting unit 338 accumulates the number of reproduction transmitted from each of the viewer's terminal 204 for each pay broadcast program/commercial. In the above-described formula (1), "the number of times the viewer views the broadcast program" is substituted for "the number of times the broadcast program has been delivered to viewer's terminal".

Embodiment 2

In the above first embodiment, commercials are inserted into a pay broadcast program as the CM information management site 203 chooses. In the second embodiment, users can choose interesting commercials as well as pay broadcast programs using the viewer's terminal 204.

Since the construction of this embodiment is almost the same as in the first embodiment, the following focuses on the construction specific to the second embodiment, with reference to FIG. 3.

The broadcast program list management unit 331 in the CM information management site 203 stores a list of commercials to be inserted into pay broadcast programs as well as the pay broadcast program list. On the commercial list, available commercial titles are listed.

On receiving a notification of a broadcast program list acquisition request, the transmission/reception controlling unit 336 reads the commercial list as well as the broadcast program list and notifies the modem 335 of them.

The modem 335 transmits the commercial list as well as the broadcast program list to the viewer's terminal 204 that has issued the request.

On receiving a transmission request for a pay broadcast program together with a notification of a list of selected commercials from the viewer's terminal 204, the modem 335 notifies the contents management unit 333 of them.

The editor (not illustrated) reads the commercials whose titles are listed on the list of selected commercials among commercials stored in the contents server 332, inserts the read commercials into the pay broadcast program to produce the pay broadcast program with commercials, and stores it in the contents server 332.

On receiving the commercial list as well as the broadcast program list from the CM information management site 203, the modem 344 in the viewer's terminal 204 notifies the transmission/reception controlling unit 343 of them. Conversely, on receiving a transmission request for a pay broadcast program as well as a notification of a list of selected commercials from the transmission/reception controlling unit 343, the modem 344 transmits them to the CM information management site 203.

On receiving a notification of the broadcast program list and the commercial list from the modem 344, the transmission/reception controlling unit 343 notifies the audiovisual data processing unit 347 of them. Then, on being notified of the selected broadcast program title by the input signal processing unit 342, the transmission/reception controlling unit 343 instructs the audiovisual data processing unit 347 to display a CM selection screen. On receiving a notification of the selected commercial titles from the input signal processing unit 342, the transmission/reception controlling unit 343 notifies the modem 344 of a list of the selected commercials as well as a transmission request for the pay broadcast program.

On receiving a notification of the broadcast program list and the commercial list from the transmission/reception controlling unit 343, the audiovisual data processing unit 347 makes the monitor 352 display the pay broadcast program selection screen (See FIG. 7). On receiving an instruction for displaying a CM selection screen from the transmission/reception controlling unit 343, the audiovisual data processing unit 347 makes the monitor 352 display the CM selection screen which indicates the contents of the commercial list.

Figure 9:
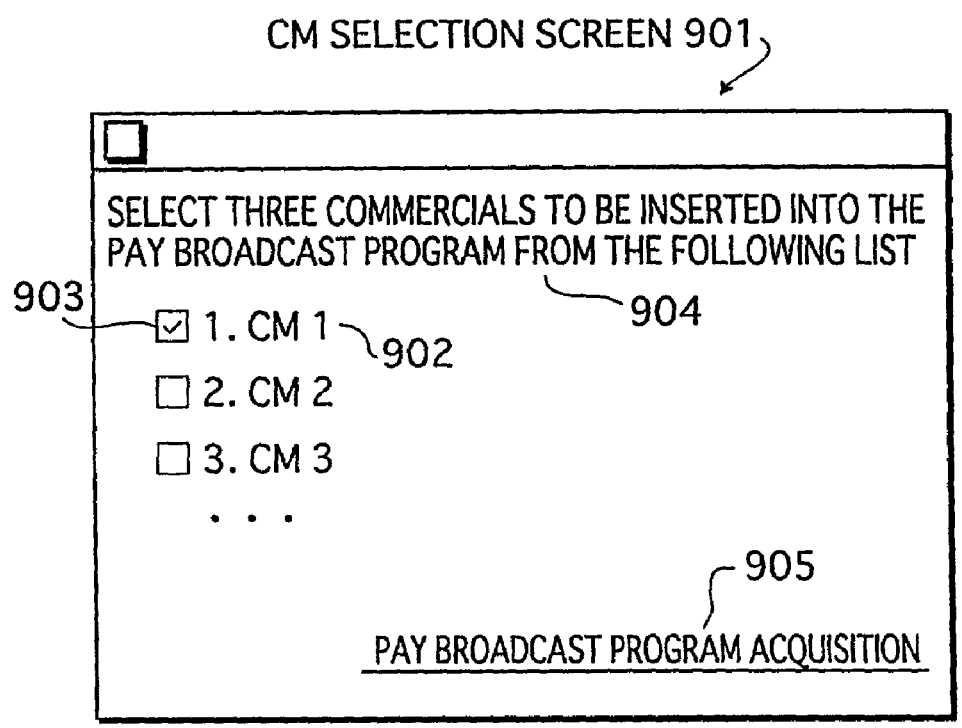
FIG. 9 shows one example of a CM selection screen that is displayed on the monitor in the broadcast program transmission/reception system according to the second embodiment of the invention.

FIG. 9 shows one example of the CM selection screen displayed on the monitor 352. On the CM selection screen 901, available CM titles 902 and check boxes 903 for indicating selection are displayed. A notation 904 indicating that a predetermined number of commercials should be selected is also displayed on the screen 901. If the predetermined number (e.g., 3) of checkmarks are placed in the check boxes 903, then users can operate a button for "pay broadcast program acquisition" 905.

On receiving a signal of selection of a pay broadcast program title from the remote control 351, the input signal processing unit 342 notifies the transmission/reception controlling unit 343 of the pay broadcast program title. On receiving a signal of selection of commercial titles from the remote control 351, the input signal processing unit 342 sequentially notifies the transmission/reception controlling unit 343 of the commercial titles. On receiving a signal of operation of the "pay broadcast program acquisition" button 905, the input signal processing unit 342 notifies the transmission/reception controlling unit 343 of an acquisition request for the pay broadcast program.

In this way, according to this embodiment, users can select not only pay broadcast programs but also commercials to be inserted into the pay broadcast programs, so that interesting commercials for users can be provided.

Embodiment 3

In the above first embodiment, the contents transmission counting unit 338 in the CM information management site 203 calculates an advertisement fee to be demanded from the commercial sponsor site 202. In the third embodiment, the contents transmission counting unit 338 further draw up a CM selection rate table indicating trends in users' demands for commercials and provides the table for the commercial sponsor site 202.

Since the construction of this embodiment is almost the same as in the first embodiment, FIG. 3 is referred to again for explanation.

FIG. 10 shows one example of the CM selection rate table that is made by the contents transmission counting unit 338.

The CM selection rate table 1001 includes the fields of CM title 1002, the number of CM transmission 1003, CM selection rate 1004, breakdown of viewers 1005, and breakdown of pay broadcast program 1006 for each commercial.

In the field of CM title 1002, CM titles for identifying commercials that have been inserted into pay broadcast programs are recorded. In the field of the number of CM transmission 1003, the number of times the commercial has been transmitted to the viewer's terminal 204 is recorded. In the field of CM selection rate 1004, a ratio of the number of transmission of each commercial to the total transmission numbers recorded in the number of CM transmission 1003 is expressed as a percentage. This ratio means the ratio of the number of times the commercial has been selected to the number of times all of the commercials that have been provided. Although there is no description in the field of breakdown of viewers 1005 in this example, users' attributes such as gender and age groups are recorded in this field. Further, although there is no description in the field of breakdown of pay broadcast program 1006 in this example, the title and the number of the pay broadcast programs into which the commercial has been inserted are recorded in this field.

The contents transmission counting unit 338 records the CM title 402 included in the header information 401 in the field of CM title 1002, and the number of commercials which is obtained by accumulating the number of commercials included in the header information 401 in the field of the number of CM transmission 1003. The contents transmission counting unit 338 further records the pay broadcast program title 402 into which the commercials specified by the header information 401 have been inserted in the field of breakdown of pay broadcast program 1006. In the field of CM selection rate 1003, CM selection rates for each commercial for a predetermined duration (e.g., one month) that is calculated from the following formula (2) are recorded.

CM selection rate=the number of transmission of each commercial/the total number of transmission of all commercials×100 (2)

In the field of breakdown of viewers 1005, users' attributes of the viewer's terminals 204 that have been registered in advance are recorded.

Note that the third embodiment is especially effective for the case where users can select interesting commercials as in the above second embodiment. That is, the CM selection rate table can be reliable information so as to understand what kind of commercials users are interested in. The commercial sponsor can estimate commercials for its own products using the CM selection rate table provided by the CM information management site 203.

Embodiment 4

The construction of the fourth embodiment is almost the same as in the first embodiment shown in FIG. 3, and so the following explanation refers to FIG. 3. In this embodiment, the CM selection screen 901 displayed on the monitor 352 is improved so as to be made more user-friendly CM selection screen. Different elements from the construction in the second embodiment will be described in the following section.

The broadcast program list management unit 331 in the CM information management site 203 stores a list of commercials. On this commercial list, available commercial titles are listed, each commercial title is followed by a comment as added information. The comment suggests the contents of the commercial. Pictures, images, and sounds may be added instead of the comment.

The audiovisual data processing unit 347 makes the monitor 352 display the CM selection screen which indicates the contents of the commercial list.

Figure 11:
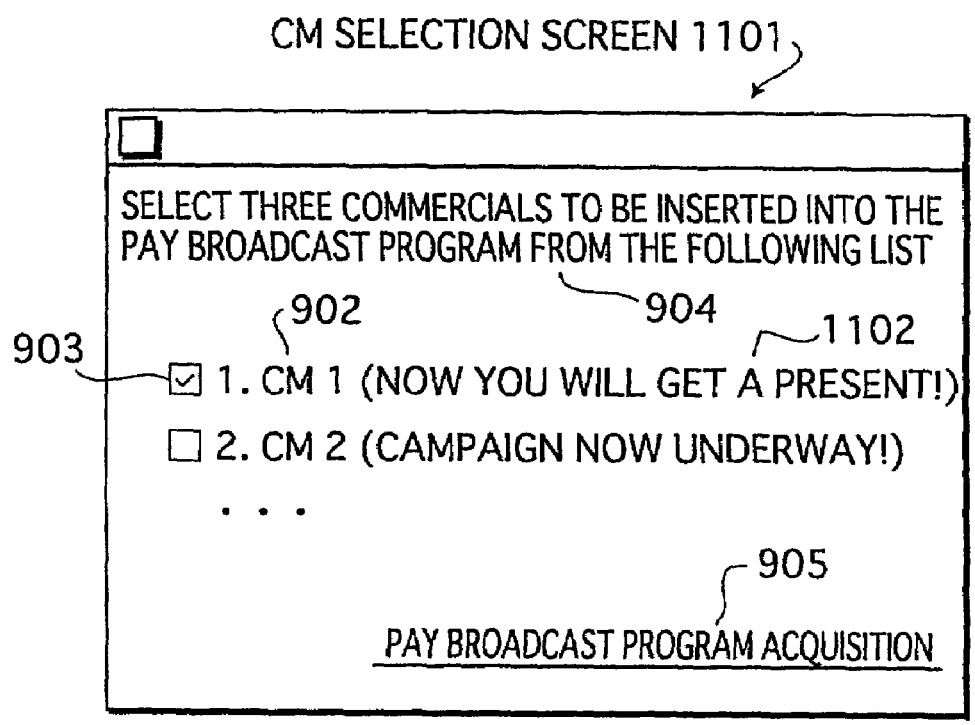
FIG. 11 shows one example of a CM selection screen that is displayed on the monitor in the broadcast program transmission/reception system according to the fourth embodiment of the invention.

FIG. 11 shows one example of the CM selection screen. On the CM selection screen 1101, comments 1102 are displayed in addition to the CM titles 902, the check boxes 903, the notation 904, and the "pay broadcast program acquisition" button 905, which are shown in FIG. 9.

In this way, the comment added to each CM title facilitates users' selection of commercials, so that advertisement effectiveness obtained from commercials can be further improved.

Embodiment 5

Unlike the second embodiment where the predetermined number of commercials are selected, a base point is set at each commercial and users select commercials so as to attain a predetermined point in the fifth embodiment.

The construction of this embodiment is almost the same as in the first embodiment, and so the following explanation refers to FIG. 3. The explanation for the same elements as in the second embodiment are also omitted, but the elements specific to this embodiment will be described in the following section.

The broadcast program list management unit 331 stores a commercial list. On the commercial list, available CM titles are listed, and a base point is described corresponding to each CM title.

The base point is set according to the agreement between the CM information management site 203 and the commercial sponsor site 202. Unless users select commercials so that the total of base points becomes 100 points or more, for example, users cannot issue an acquisition request for pay broadcast programs.

It is expected that the commercials with high points tend to be selected by users. As such, the commercial sponsor site 202 can increase the base point for a commercial for a duration when the sponsor wishes to receive viewers' attention to the commercial.

The contents transmission counting unit 338 stores a base point for each commercial. In the above embodiments, the contents transmission counting unit 338 stores an advertisement fee for transmitting a commercial once, while in this embodiment the unit 338 stores an advertisement fee for one point. Then, an advertisement fee for one transmission of a commercial is obtained by multiplying the advertisement fee for one point by the base point for the commercial.

FIG. 12 shows one example of an advertisement fee list out of the usage charge/advertisement fee lists made by the contents transmission counting unit 338.

The advertisement fee list 1201 includes the fields of CM title 1202, the number of provision for viewers' terminals 1203, fee for one point 1204, base point 1205, and advertisement fee 1206.

The CM title 1202 shows titles of commercials which have been inserted into pay broadcast programs. The number of provision for viewers' terminal 1203 equals to the value obtained by accumulating the number of times each commercial has been transmitted to the viewer's terminal 204. A fee for one point 1204 is a unit of advertisement fees predetermined according to the agreement between the commercial sponsor site 202 and the CM information management site 203. As a user select commercials, the base points 1205 for the commercials are summed up by the viewer's terminal 204 as described above.

The advertisement fee 1206 is calculated from the following formula (3) by the contents transmission counting unit 338.

Advertisement fee=the number of times the commercial has been provided for the viewer's terminal×a fee for one point×base point (3)

On receiving an instruction for displaying a CM selection screen from the transmission/reception controlling unit 343, the audiovisual data processing unit 347 in the viewer's terminal 204 makes the monitor 352 display the CM selection screen indicating the contents of the commercial list.

Figure 13:
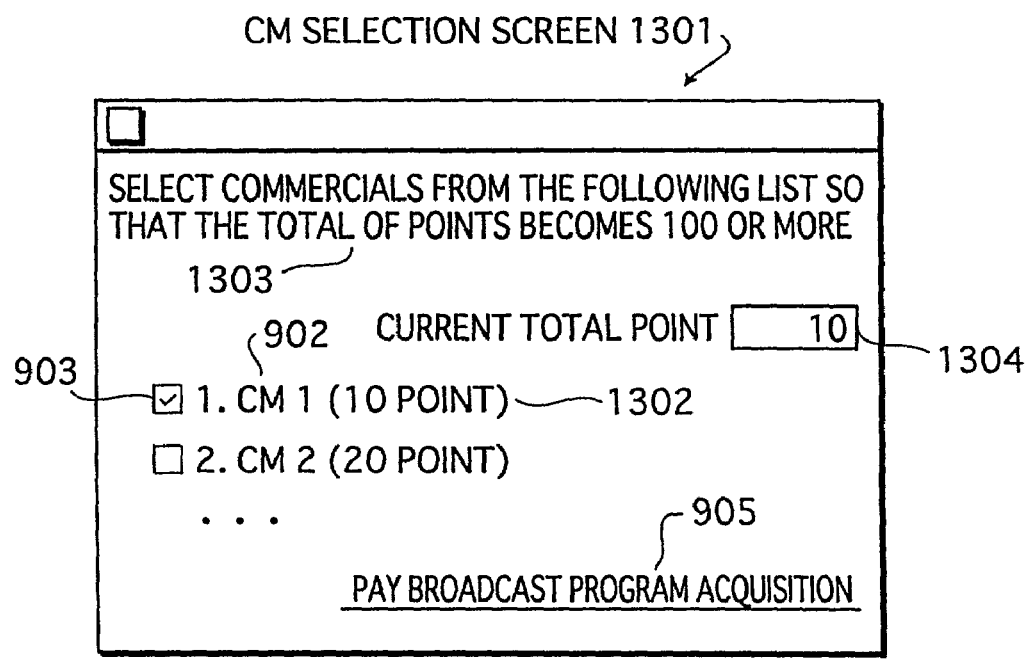
FIG. 13 shows one example of a CM selection screen that is displayed on the monitor in the fifth embodiment.

FIG. 13 shows one example of the CM selection screen. On the CM selection screen 1301, CM titles 902, check boxes 903, and a "pay broadcast program acquisition" button 905 are displayed. Here, each CM title is followed by the corresponding base point 1302. A notation 1303 indicating that commercials to be inserted into pay broadcast programs should be selected so that the total point becomes a predetermined point or more is also displayed. The total of the base points for commercials that have been selected by a user is displayed in the field of the current total point 1304.

In this figure, if the value in the field of the current total point 1304 becomes 100 or more, users are allowed to use the "pay broadcast program acquisition" button 905.

On being notified of an instruction for placing a checkmark in the check box 903 corresponding to the selected CM title 902 and the total point to be indicated in the field 1304 from the transmission/reception controlling unit 343, the audiovisual data processing unit 347 updates the contents of the CM selection screen 1301.

On receiving a signal for selecting CM titles from the remote control 351, the input signal processing unit 342 notifies the transmission/reception controlling unit 343 of it.

Then, the transmission/reception controlling unit 343 instructs the audiovisual data processing unit 347 to display the CM selection screen and reset the value of the counter to zero. On being notified of a signal of selection of the CM title from the input signal processing unit 342, the transmission/reception controlling unit 343 adds the base point corresponding to the CM title to the value of the counter, notifies the audiovisual data processing unit 347 of the value of the counter, and instructs the audiovisual data processing unit 347 to place a checkmark on the check box corresponding to the CM title.

If the value of the counter becomes 100 or more, for example, the transmission/reception controlling unit 343 makes the "pay broadcast program acquisition" button 905 operable.

As stated above, according to this embodiment, a base point is set at each commercial, so that commercials with higher points tend to be selected by users. That is, advertisement fee is set higher in return for increase in opportunities to be selected by users.

In each of the above-described embodiments, transmission between modems is performed via public communication line, while pay broadcast programs/pay broadcast programs with commercials are transmitted via broadcasting wave. However, these transmission may be performed via up/down line using a coaxial cable as in the CATV or via the Internet.

In each of the above-described embodiments, the contents server 341 is provided in the viewer's terminal 204. However, each system may be altered so that the contents server 341 is removed and the pay broadcast programs with commercials received by the contents reception unit 345 is output via the contents management unit 346 to the audiovisual data processing unit 347 to be reproduced.

In each of the above-described embodiments, CM titles are listed for identifying each commercial in the commercial list. However, instead of the titles, product names, producer names, categories, and the like which can identify the commercial may be listed.

Embodiment 6

Figure 14:
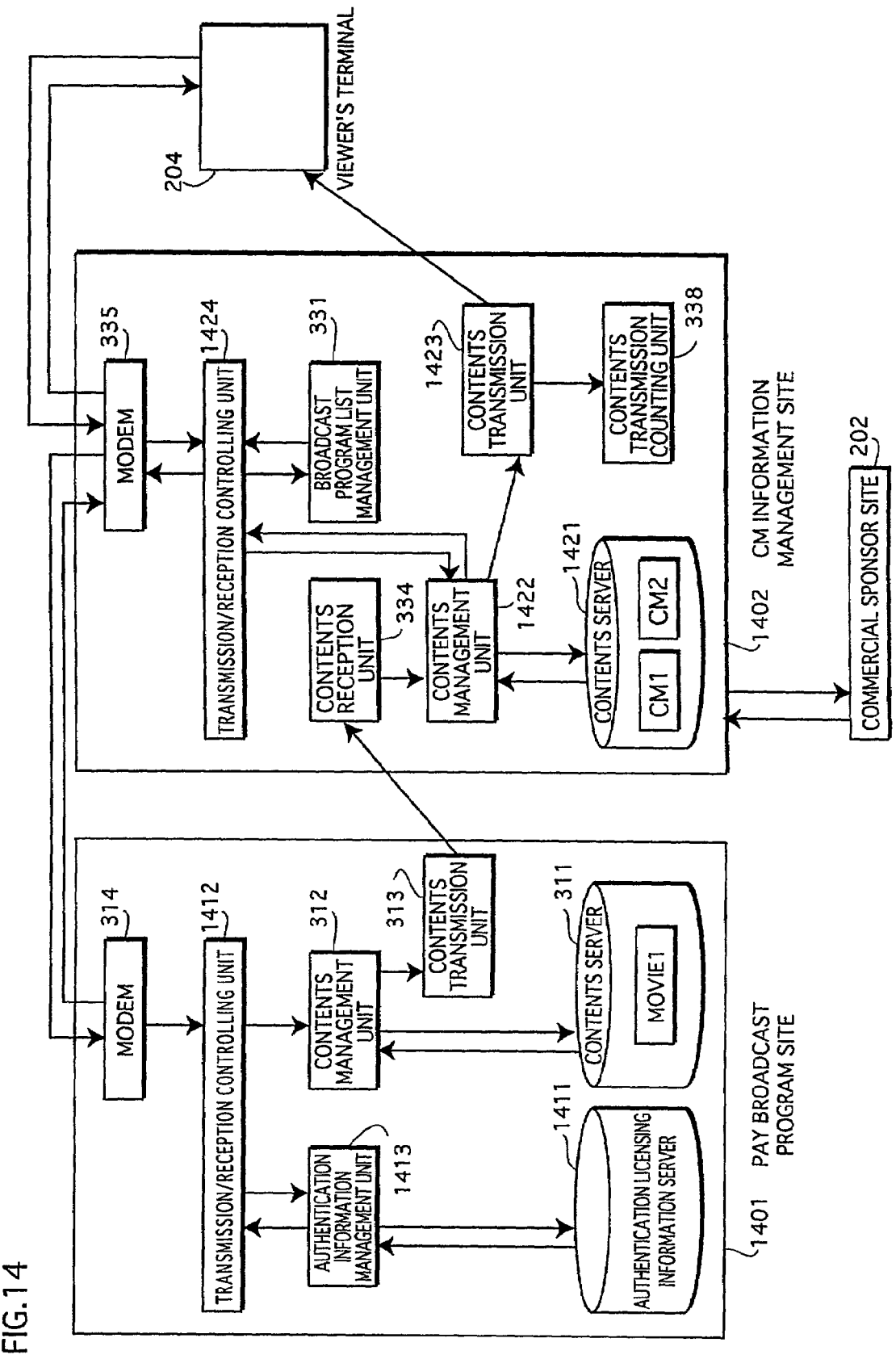
FIG. 14 shows the construction of a broadcast program transmission/reception system according to the sixth embodiment of the invention.

FIG. 14 is a schematic diagram showing the construction of the broadcast program transmission/reception system according to the sixth embodiment in this invention. The broadcast program transmission/reception system includes a pay broadcast program site 1401, a plurality of CM information management sites 1402 as retailers of pay broadcast programs, a plurality of viewer's terminals 204, and a commercial sponsor site 202.

The pay broadcast program site 1401 is provided with a contents server 311, a contents management unit 312, a contents transmission unit 313, a modem 314, an authentication licensing information server 1411, a transmission/reception controlling unit 1412, and an authentication information management unit 1413.

The CM information management site 1402 is provided with a contents server 1421, a contents management unit 1422, a contents transmission unit 1423, a transmission/reception controlling unit 1424, a broadcast program list management unit 331, a contents reception unit 334, a modem 335, and a contents transmission counting unit 338.

Note here that construction elements which are the same as in the above first embodiment have been assigned the same reference numerals and their explanation will be omitted. The following description focuses on the construction elements specific to this embodiment.

The authentication licensing information server 1411 is composed of a hard disk and the like, and stores authentication licensing information consisting of a plurality of pieces of authentication information on the plurality of CM information management sites 1402.

FIG. 15 shows one example of the authentication licensing information. A piece of information indicated in each line of the table makes up authentication information. The authentication licensing information 1501 includes a site ID 1502, a password 1503, a delivery form 1504, a destination 1505, a pay broadcast program title 1506, and a CM title 1507, and a CM category 1508.

The site ID 1502 is an identifier for uniquely identifying each CM information management site 1402. The site ID may be an IP address on the Internet for each CM information management site 1402, for example.

The password 1503 is used for authenticating the CM information management site 1402 identified with the site ID 1502 as a legitimate CM information management site. The password 1503 is issued by the pay broadcast program site 1401 when the agreement on the provision of pay broadcast programs is made between the pay broadcast program site 1401 and the CM information management site 1402.

The delivery form 1504 indicates a communication form between the CM information management site 1402 and the viewer's terminal 204 and is determined by types of viewer's terminal 204. The delivery form 1504, for example, includes a cellular phone, the Internet, and broadcasting wave. That is, the delivery form 1504 is defined as the viewer's terminal is one of a cellular phone, a personal computer, a television, and the like. With this information, the pay broadcast program site 1401 can put restrictions on delivery form for each CM information management site 1402 and for a pay broadcast program.

The destination 1505 includes information on a viewer's terminal's location and viewer's information such as age groups. The location information includes a country, a region, an IP address, for example. For instance, in the case that a pay broadcast program is a movie, such information enables the pay broadcast program site 1401 to deliver the movie at regions where the showing period of the movie has finished, but prohibit delivery of the movie at regions where the movie is now showing at the theaters. Similarly, the viewer's age group may be included in the restrictions on viewers.

The pay broadcast program title 1506 whose copyright is owned by the pay broadcast program site 1401 is an identifier for uniquely identifying the pay broadcast program that is provided for the viewer's terminal 204 via the CM information management site 1402.

The CM title 1507 is an identifier for uniquely identifying the commercial that is inserted into the pay broadcast program identified with the pay broadcast program title

1506. This information enables only commercials provided by the sponsor who has a tie-up with the pay broadcast program site 1401 to be inserted in the pay broadcast program.

The CM category 1508 shows the category to which the commercial identified with the CM title 1507 belongs.

As stated above, the CM title 1507 and the CM category 1508 are included in the authentication licensing information 1501 of the CM information management site 1402 in this embodiment. This is because the pay broadcast program site 1401 becomes capable of denying provision of a pay broadcast program for a viewer's terminal, if the commercials are not suitable for the pay broadcast program. For instance, the pay broadcast program site 1401 does not approve the commercials for alcoholic drinks to be inserted into a pay broadcast program targeted for children.

On being notified of the authentication information including a pay broadcast program title by the modem 314 via the transmission/reception controlling unit 1412, the authentication information management unit 1413 judges whether the notified information complies with the authentication information described in each line of the authentication licensing information 1501 stored in the authentication licensing information server 1411.

FIG. 16 shows one example of the authentication information transmitted from the CM information management site 1402. As shown in this table, the authentication information 1601 includes descriptions of a site ID 1602, a password 1603, a delivery form 1604, a destination 1605, a pay broadcast program title 1606, a CM title 1607, and a CM category 1608.

As for this authentication information 1601, the information described in the field of the delivery form 1604 (i.e., cellular phone) matches the contents in the delivery form 1504 described in the first line of the authentication licensing information 1501. Although the authentication information 1601 does not include the description "CM3" in the field of CM title 1607, other information matches the authentication information described in the first line of the authentication licensing information 1501.

When judging that the notified authentication information matches one of the authentication information stored in the authentication licensing information server 1411, the authentication information management unit 1413 notifies the contents management unit 312 of the broadcast program title 1506 via the transmission/reception controlling unit 1412, and instructs the contents management unit 312 to transmit the pay broadcast program to the CM information management site 1402 that has issued the request.

Then the contents management unit 312 reads the pay broadcast program with the notified title from the contents server 311, and notifies the contents transmission unit 313 of the read pay broadcast program together with the authentication licensing notification. The contents transmission unit 313 transmits the pay broadcast program together with the authentication licensing notification to the CM information management site 1402 that has issued the request.

Conversely, when judging that the notified authentication information does not match any authentication information stored in the authentication licensing information server 1411, the authentication information management unit 1413 instructs the modem 314 to transmit an authentication refusal notification to the CM information management site 1402 that has issued the request via the transmission/reception controlling unit 1412.

The contents server 1421 is composed of a hard disk and the like, and stores commercials to be inserted into pay broadcast programs.

On receiving the pay broadcast program together with the authentication licensing notification, the contents reception unit 334 notifies the contents management unit 1422 of the pay broadcast program.

On receiving the notification of the pay broadcast program, the contents management unit 1422 instructs an editor (not illustrated) to edit the pay broadcast program so as to include commercials stored in the contents server 1421. Here, the transmission/reception controlling unit 1424 has notified the editor of the CM titles that had been recorded in the field of CM title 1607 in the authentication information 1601. Then, the editor inserts the commercials with the notified titles into the pay broadcast program.

The editor may store the produced pay broadcast program with commercials in the contents server 1421 as in the above-mentioned embodiments, or store it in the temporary storage area (not illustrated).

On receiving a notification of the delivery form 1604 recorded on the authentication information 1601 and the viewer's terminal 204 that has issued the request, the contents management unit 1422 reads the pay broadcast program with commercials from the contents server 1421 or the temporary storage area, and instructs the contents transmission unit 1423 to transmit the pay broadcast program with commercials to the viewer's terminal 204 that has issued the request in accordance with the content of the delivery form 1604.

Immediately after reading the pay broadcast program with commercials and notifies the contents transmission unit 1423 of all of the broadcast programs, the contents management unit 1422 deletes the pay broadcast program with commercials stored in the contents server 1421 or the temporary storage area. Thereby, illegal usage of pay broadcast programs can be prevented.

In accordance with the delivery form 1604 notified by the contents management unit 1422, the contents transmission unit 1423 transmits the pay broadcast program with commercials to the viewer's terminal 204 that has issued the request.

On being notified of the transmission request for the pay broadcast program from the viewer's terminal 204 via the modem, the transmission/reception controlling unit 1424 generates the authentication information 1601 (See FIG. 16) including the pay broadcast program title 1606. Here, CM titles 1607 to be inserted into the pay broadcast program are inquired from the contents management unit 1422 or selected by the viewer's terminal. For instance, in the case of the viewer's terminal being a cellular phone, a personal computer, and a TV, the delivery form 1604 should be described as a cellular phone, the Internet, and the broadcasting wave, respectively.

The site ID 1602 is an identifier for identifying the CM information management site 1402 itself, and the password 1603 is issued by the pay broadcast program site 1401 when concluding the agreement.

The transmission/reception controlling unit 1424 notifies the modem 335 of the generated authentication information 1601.

On receiving an authentication refusal notification from the pay broadcast program site 1401 via the modem 335, the transmission/reception controlling unit 1424 transmits the authentication refusal notification to the viewer's terminal 204 that has issued the request via the modem 335.

On being notified of the authentication information 1601 by the transmission/reception controlling unit 1424, the modem 335 transmits the authentication information 1601 to the pay broadcast program site 1401.

Figure 17:
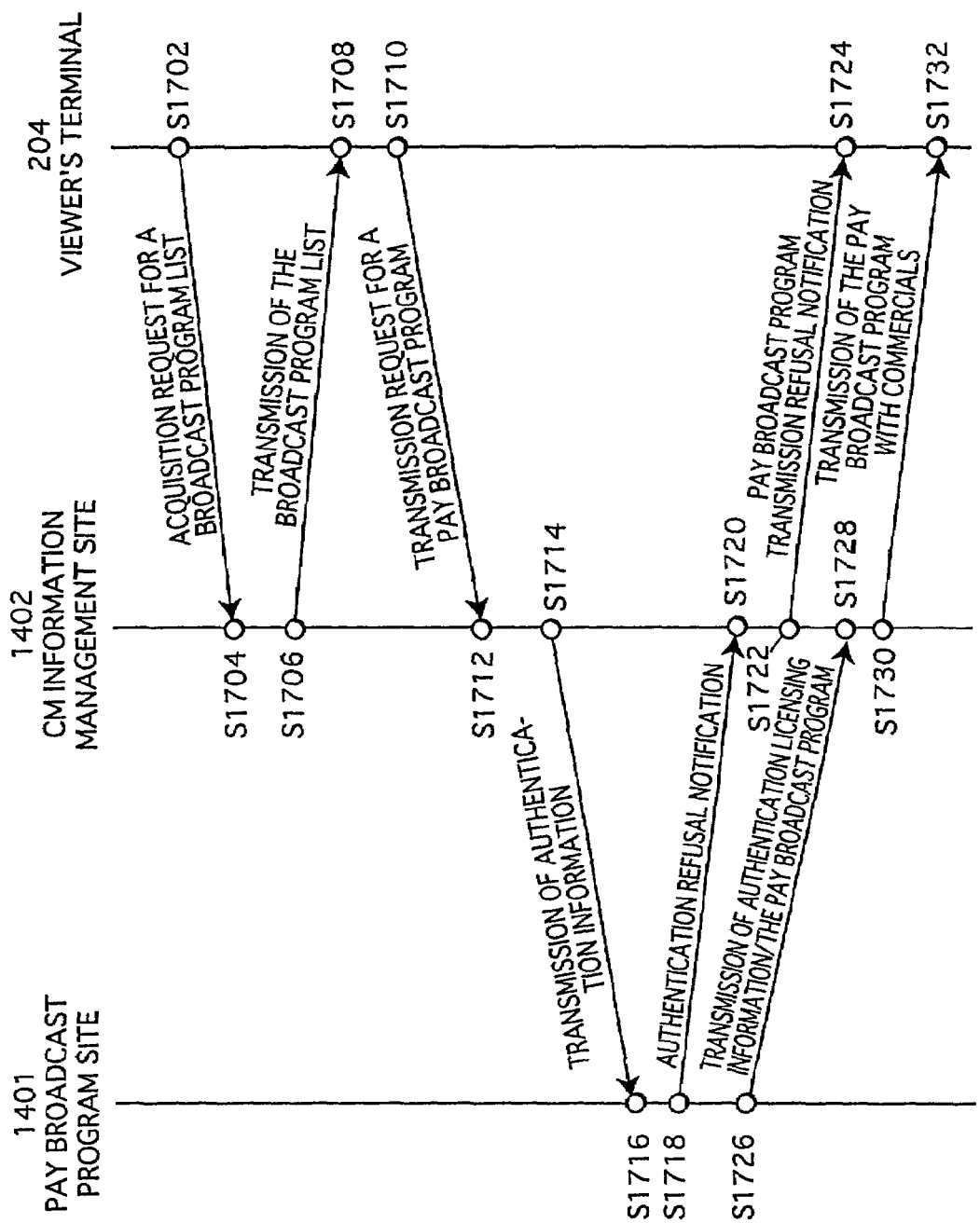
FIG. 17 shows message sequence among the pay broadcast program site, the CM information management site, and the viewer's terminal in the sixth embodiment.

The following describes the operations in this embodiment with reference to the message sequence shown in FIG. 17. Note that explanation for steps from S1702 to S1710 will be omitted because these steps are the same as the steps from S802 to S801 described in the above first embodiment referring to FIG. 8.

At S1712, the transmission/reception controlling unit 1424 in the CM information management site 1402 receives a notification of a transmission request for a pay broadcast program from the viewer's terminal 204 via the modem 335, and creates the authentication information 1601 (S1712). The authentication information 1601 includes a site ID 1602 and a password 1603 so as to prove that the CM information management site 1402 has been approved as a legitimate retailer of pay broadcast programs, in addition to the pay broadcast program title 1606 to be requested. The authentication information further includes the delivery form 1604 determined by the type of the viewer's terminal 204, the destination 1605 including information on the viewer's terminal's location and the like, the CM titles 1607 to be inserted into the pay broadcast program, and the CM category indicating the categories to which the commercials belong.

The modem 335 transmits the authentication information created by the transmission/reception controlling unit 1424 to the modem 314 in the pay broadcast program site 1401 (S1714).

The modem 314 in the pay broadcast program site 1401 receives the authentication information transmitted from the CM information management site 1402.

On being notified of the authentication information 1601 received by the modem via the transmission/reception controlling unit 1412, the authentication information management unit 1413 judges whether the notified authentication information 1601 matches one of the authentication licensing information 1501 which is stored in the authentication licensing information server 1411 and which is made up of a plurality of authentication information on the CM information management site (S1716).

In the case that the notified authentication information 1601 does not match any of the authentication information included in the authentication licensing information 1501, the authentication information management unit 1413 creates an authentication refusal notification indicating that the pay broadcast program cannot be transmitted.

On being notified of the authentication refusal notification via the transmission/reception controlling unit 1412, the modem 314 transmits it to the CM information management site 1402 (S1718).

At the side of the CM information management site 1402, when the modem 335 receives the authentication refusal notification, the transmission/reception controlling unit 1424 creates a pay broadcast program transmission refusal notification indicating that the pay broadcast program cannot be transmitted (S1720).

The modem 335 transmits the pay broadcast program transmission refusal notification to the viewer's terminal 204 that has issued the request (S1722).

At the side of the viewer's terminal 204, on receiving the pay broadcast program transmission refusal notification, the monitor 352 displays that the pay broadcast program failed to be obtained (S1724).

Alternatively, in the case that the authentication information management unit 1413 judges that the notified authentication information 1601 matches one of the authentication licensing information 1501, the authentication information management unit 1413 notifies the contents management unit 312 of the broadcast program title 1606 via the transmission/reception controlling unit 1412, and instructs the contents management unit 312 to transmit an authentication licensing notification.

Then, the contents management unit 312 reads the pay broadcast program with notified title from the contents server 311, and notifies the contents transmission unit 313 of the pay broadcast program together with the authentication licensing notification.

The contents transmission unit 313 transmits the pay broadcast program together with the authentication licensing notification to the CM information management site that has issued the request (S1726).

The contents reception unit 334 in the CM information management site 1402 receives the pay broadcast program together with the authentication licensing notification from the pay broadcast program site 1401 (S1728).

The received pay broadcast program is stored in the temporary storage area (not illustrated). The editor (not illustrated) reads the commercials identified with the CM titles 1607 contained in the authentication information 1601 from the contents server 1421, and edits the stored pay broadcast program so as to include the commercials.

The contents transmission unit 1423 transmits the pay broadcast program with commercials to the viewer's terminal 204 that has issued the request in accordance with the delivery form 1604 described in the authentication information 1601 (S1730).

The viewer's terminal that receives the pay broadcast program with commercials reproduces it (S1732).

In terms of protecting copyrights of pay broadcast programs, in this embodiment, it is preferable that pay broadcast programs with commercials are reproduced in real time according to the streaming method to that those broadcast programs are downloaded into the contents server 341 in each viewer's terminal 204.

In addition, in this embodiment, when issuing a transmission request for a pay broadcast program, the CM information management site also issues identification information on the viewer's terminal 204 that has issued the request so that illegitimate CM information management sites cannot obtain pay broadcast programs from the pay broadcast program site 1401 to discount the charges of the pay broadcast programs unreasonably.

Then, the pay broadcast program site 1401 may transmit the encrypted pay broadcast program to the CM information management site and directly transmits a key for decoding to the viewer's terminal 204. In this case, the key of cryptograph stored in the IC card 349 as in the first embodiment is not used.

Although the CM information management sites 203 and 1402 transmit the list of commercials to the viewer's terminal 204 concurrently with the broadcast program list in the above second and later embodiments, these sites may transmit the broadcast program list at first to receive designation of the broadcast program titles from the viewer's terminal 204, and then transmit the list of commercials. In this case, the broadcast program list management unit 331 should store a plurality of lists of commercials corresponding to pay broadcast programs. The transmission/reception controlling units 336 and 1424 then selects one list of commercials corresponding to the pay broadcast program title, and transmit the list to the viewer's terminal 204 that has issued the request. Thereby, commercials which match a pay broadcast program can be inserted into the pay broadcast program.

The above embodiments deal with the case where commercials are inserted into pay broadcast programs. Naturally, these commercials may include either videos or sounds.

In each of the above embodiments, the construction of the system is described with reference to FIGS. 3 and 14. However, functions obtained by each construction element can be embodied by programs which make a computer perform the same functions. These programs may be recorded on a recording medium that is readable to the computer so as to apply to the broadcast program transmission/reception system by which commercials are inserted into a pay broadcast program and the pay broadcast program with commercials is transmitted to the viewer's terminals.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcast program transmission/reception system that inserts one or more commercials into a pay broadcast program and transmits the pay broadcast program with one or more commercials to one of a plurality of viewer's terminals, the broadcast program transmission/reception system comprising:
   a pay broadcast program site for providing pay broadcast programs;
   a plurality of commercial information management sites, each of which presents a list of the pay broadcast programs to a viewer's terminal as requested by the viewer's terminal, receives a pay broadcast program designated by the viewer's terminal from the pay broadcast program site, and transmits the pay broadcast program with one or more commercials to the viewer's terminal; and
   the plurality of viewer's terminals, each of which requests the list of the pay broadcast programs from any one of the plurality of commercial information management sites, requests a pay broadcast program included in the list of the pay broadcast programs from the commercial information management site, and receives and reproduces the pay broadcast program with one or more commercials.

2. The broadcast program transmission/reception system of claim 1, wherein
   each of the plurality of commercial information management sites includes:
   a pay broadcast program list storage unit for storing a pay broadcast program list on which pay broadcast program identifiers are listed;
   a commercial storage unit for storing a plurality of commercials;
   a pay broadcast program list transmission unit for, when receiving a transmission request for the pay broadcast program list from a viewer's terminal, reading the list from the pay broadcast program list storage unit, and transmitting the list to the viewer's terminal;
   a transmission request reception unit for receiving a transmission request for a pay broadcast program from a viewer's terminal, the transmission request including a pay broadcast program identifier included in the pay broadcast program list and corresponding to the requested pay broadcast program;
   a pay broadcast program transmission requesting unit for issuing a transmission request for the pay broadcast program in accordance with the transmission request issued by the viewer's terminal to the pay broadcast program site;
   a reception unit for receiving the pay broadcast program from the pay broadcast program site;
   an edit unit for reading one or more commercials from the commercial storage unit and edit the pay broadcast program by inserting the commercials therein to produce a pay broadcast program with commercials;
   a transmission unit for transmitting the pay broadcast program with commercials to the viewer's terminal that has requested the pay broadcast program; and
   a transmission counting unit for accumulating the number of pay broadcast programs/commercials that have been transmitted to the viewer's terminals for each pay broadcast program/commercial.

3. The broadcast program transmission/reception system of claim 2, wherein
   each of the commercial information management sites further includes:
   a commercial list storage unit for storing a commercial list on which identifiers of available commercials stored in the commercial storage unit are listed,
   wherein the pay broadcast program list transmission unit reads the commercial list from the commercial list storage unit as well as the pay broadcast program list, and transmits both of the lists to the viewer' terminal that has requested the program list,
   the transmission request reception unit receives identifiers of commercials selected from the commercial list by the viewer's terminal, as well as the pay broadcast program identifier, and
   the edit unit reads commercials corresponding to the identifiers of the selected commercials from the commercial storage unit to edit a pay broadcast program with commercials,
   each of the viewer's terminals includes:
   a pay broadcast program list requesting unit for requesting a pay broadcast program list from a commercial information management site;
   a list reception unit for receiving the pay broadcast program list and a commercial list from the commercial information management site;
   a display control unit for displaying, on a monitor, a broadcast program selection screen on which a plurality of titles of pay broadcast programs are listed according to the content of the program list, and after a viewer selects a pay broadcast program title, displaying, on the monitor, a commercial selection screen on which a plurality of identifiers of commercials are listed according to the content of the commercial list;
   a transmission request transmission unit for transmitting a transmission request for the pay broadcast program, the transmission request including the title of the selected pay broadcast program and the identifiers of the selected commercials;
   a reception unit for receiving the pay broadcast program with commercials; and
   a reproduction unit for reproducing the pay broadcast program with commercials received by the reception unit.

4. The broadcast program transmission/reception system of claim 3, wherein the commercial list storage unit in the commercial information management site further stores predetermined points set for each commercial identifier, the points for a commercial identifier are given to the viewer's terminal that selects a commercial corresponding to the commercial identifier, and the display control unit in the viewer's terminal displays predetermined points corresponding to each commercial identifier displayed on the commercial selection screen, wherein each of the viewer's terminals further includes:

a commercial selection reception unit for receiving a selection of a commercial identifier among the plurality of commercial identifiers displayed on the monitor; and a transmission request permission unit for, every time a commercial identifier is selected, accumulating total points by adding corresponding predetermined points to a current total points, and when the total points becomes predetermined value or more, permitting a transmission request of the pay broadcast program to be issued.

5. The broadcast program transmission/reception system of claim 4, wherein the commercial information management site further includes:

an advertisement fee calculation unit for calculating an advertisement fee for a commercial based on a base fee set for one point, predetermined points corresponding to the commercial, the number of times the commercial has been transmitted.

6. The broadcast program transmission/reception system of claim 3, wherein each of the viewer's terminals further includes:

a commercial selection reception unit for receiving a selection of a commercial identifier among the plurality of commercial identifiers displayed on the monitor; and a transmission request permission unit for, when a predetermined number of the commercial identifiers has been selected, permitting a transmission request of the pay broadcast program to be issued.

7. The broadcast program transmission/reception system of claim 3, wherein the commercial list storage unit in the commercial information management site further stores added information for each commercial identifier, the added information indicating the content of a commercial corresponding to the commercial identifier, and the display control unit in the viewer's terminal displays the added information corresponding to each commercial identifier on the commercial selection screen.

8. The broadcast program transmission/reception system of claim 3, wherein each of the commercial information management site further includes:

a commercial selection rate calculation unit for calculating a selection rate of each commercial selected among all of the commercials, based on the identifiers of the selected commercials received by the transmission request reception unit, the commercial selection rate being provided for a commercial sponsor that provides the commercial.

9. The broadcast program transmission/reception system of claim 2, wherein the pay broadcast program list transmission unit in each of the commercial information management sites includes:

a request distribution unit for, when the number of transmission requests for the pay broadcast program list received from each of the viewer's terminals becomes a predetermined number or more, transmitting identifying information on another commercial information management site instead of the pay broadcast program list to the viewer's terminal that has requested the pay broadcast program list, wherein the viewer's terminal that receives the identifying information on the other commercial information management site issues a transmission request for the pay broadcast program list to the commercial information management site identified with the received identifying information.

10. The broadcast program transmission/reception system of claim 2, wherein each of the commercial information management site further includes:

a usage charge/advertisement fee calculation unit for calculating a usage charge for a pay broadcast program based on a usage charge for one transmission of a pay broadcast program and the number of transmission of the pay broadcast program and calculating an advertisement fee for a commercial based on an advertisement fee for one transmission of a commercial and the number of transmission of the commercial.

11. The broadcast program transmission/reception system of claim 2, wherein the edit unit in each of the commercial information management site includes:

a header information generation unit for generating identifying information on the pay broadcast program and identifying information on each commercial inserted into the pay broadcast program and the number of commercials inserted into the pay broadcast program as header information on the pay broadcast program with commercials, the transmission counting unit in each of the commercial information management site includes:

a header information reading unit for reading the header information on the pay broadcast program with commercials transmitted by the transmission unit; and an accumulation unit for accumulating the number of pay broadcast programs and the commercials for each piece of header information.

12. The broadcast program transmission/reception system of claim 1, wherein the pay broadcast program site includes:

an authentication licensing information storage unit for storing authentication licensing information consisting of a plurality of pieces of authentication information, each piece of authentication information is used for judging whether or not to transmit a pay broadcast program to a commercial information management site;

an authentication information reception unit for receiving a piece of authentication information from the commercial information management site; and a judgement unit for judging whether the received authentication information complies with any one piece of authentication information stored in the authentication licensing information storage unit, and when the received authentication information complies with one piece of authentication information, permitting the pay broadcast program to be provided for the commercial information management unit, but when the received authentication information does not comply with any pieces of authentication information, refusing the pay broadcast program to be provided for the commercial information management site, each of the commercial information management sites includes:

an authentication information transmission unit for transmitting a piece of authentication information including a title of a pay broadcast program to the pay broadcast program site;

a reception unit for receiving an authentication licensing notification and a pay broadcast program from the pay broadcast program site, or receiving an authentication refusal notification from the pay broadcast program site;

a pay broadcast program storage unit for storing the pay broadcast program received by the reception unit;

an edit unit for editing the pay broadcast program by inserting commercials therein to generate a pay broadcast program with commercials; and a pay broadcast program with commercials transmission unit for transmitting the pay broadcast program with commercials to the viewer's terminal that has requested the pay broadcast program.

13. The broadcast program transmission/reception system of claim 12, wherein each of the commercial information management sites further includes:

a deletion unit for deleting the pay broadcast program and the pay broadcast program with commercials stored in the pay broadcast program storage unit, immediately after the pay broadcast program with commercials transmission unit transmits the pay broadcast program with commercials to the viewer's terminal.

14. The broadcast program transmission/reception system of claim 12, wherein each piece of authentication information stored in the authentication licensing information storage unit includes a delivery form, and the judgement unit judges whether the received authentication information complies with any one piece of authentication information stored in the authentication licensing information storage unit based on the delivery form.

15. The broadcast program transmission/reception system of claim 12, wherein each piece of authentication information includes a delivery form, the delivery form is defined by a type of each viewer's terminal, and the pay broadcast program with commercials transmission unit transmits the pay broadcast program with commercials to the viewer's terminal that has requested the pay broadcast program according to the delivery form specified for the viewer's terminal.

16. The broadcast program transmission/reception system of claim 12, wherein each piece of authentication information stored in the authentication licensing information storage unit includes destination information, the destination information including information on a area including a destination of the pay broadcast program and/or information on a viewer, and the judgement unit judges whether the received authentication information complies with any one piece of authentication information stored in the authentication licensing information storage unit based on the destination information.

17. The broadcast program transmission/reception system of claim 12, wherein each piece of authentication information stored in the authentication licensing information storage unit includes one of an identifier and a category of each commercial to be inserted into the pay broadcast program, and the judgement unit judges whether the received authentication information complies with any one piece of authentication information stored in the authentication licensing information storage unit based on one of the identifier and the category.

18. A pay broadcast program site that is connected to a plurality of commercial information management sites via a network, each of the plurality of commercial information management sites inserting commercials into a pay broadcast program to produce a pay broadcast program and transmitting the pay broadcast program with commercials to one of a plurality of viewer's terminals, the pay broadcast program site comprising:

an authentication licensing information storage unit for storing authentication licensing information consisting of a plurality of pieces of authentication information, each piece of authentication information is used for judging whether or not to transmit a pay broadcast program to a commercial information management site and includes a delivery form that is defined by a type of a viewer's terminal;

an authentication information reception unit for receiving a piece of authentication information from the commercial information management site;

a judgement unit for judging whether the received authentication information complies with any one piece of authentication information stored in the authentication licensing information storage unit, and when the received authentication information complies with one piece of authentication information, permitting the pay broadcast program to be provided for the commercial information management unit, but when the received authentication information does not comply with any pieces of authentication information, refusing the pay broadcast program to be provided for the commercial information management site, the delivery form being utilized for the judgement;

a pay broadcast program storage unit for storing pay broadcast programs;

a pay broadcast program transmission unit for, when the judgement means permits the transmission, reading the requested broadcast program from the pay broadcast program storage unit, and transmitting the pay broadcast program together with an authentication licensing notification to the commercial information management site that has requested the pay broadcast program.

19. A commercial information management site that is connected to a pay broadcast program site and a plurality of viewer's terminals via a network, the commercial information management site comprising:

a pay broadcast program list storage unit for storing a pay broadcast program list on which pay broadcast program identifiers are listed;

a commercial storage unit for storing a plurality of commercials;

a pay broadcast program list transmission request reception unit for receiving a transmission request for a pay broadcast program list from each of the plurality of viewer's terminals;

a pay broadcast program list transmission unit for, when receiving a transmission request for the pay broadcast program list from a viewer's terminal, reading the list from the pay broadcast program list storage unit, and transmitting the list to the viewer's terminal;

a transmission request reception unit for receiving a transmission request for a pay broadcast program from a viewer's terminal, the transmission request including a pay broadcast program identifier included in the pay broadcast program list and corresponding to the requested pay broadcast program;

a pay broadcast program transmission requesting unit for issuing a transmission request for the pay broadcast program in accordance with the transmission request issued by the viewer's terminal to the pay broadcast program site;

a reception unit for receiving the pay broadcast program from the pay broadcast program site;

an edit unit for reading one or more commercials from the commercial storage unit and edit the pay broadcast program by inserting the commercials therein to produce the pay broadcast program with commercials;

a transmission unit for transmitting the pay broadcast program with commercials to the viewer's terminal that has requested the pay broadcast program; and a transmission counting unit for accumulating the number of pay broadcast programs/commercials that have been transmitted to the viewer's terminals for each pay broadcast program/commercial.

20. The commercial information management site of claim 19 further comprising:

a commercial list storage unit for storing a commercial list on which identifiers of available commercials stored in the commercial storage unit and points that are given to the viewer's terminal when selecting a commercial are listed, wherein the pay broadcast program list transmission unit reads the commercial list from the commercial list storage unit as well as the pay broadcast program list, and transmits both of the lists to the viewer' terminal that has requested the program list, the transmission request reception unit receives identifiers of commercials selected from the commercial list by the viewer's terminal, as well as the pay broadcast program identifier, and the edit unit reads commercials corresponding to the identifiers of the selected commercials from the commercial storage unit to edit a pay broadcast program with commercials, wherein the commercial information management site further includes:

an advertisement fee calculation unit for calculating an advertisement fee for a commercial based on a base fee set for one point, predetermined points corresponding to the commercial, the number of times the commercial has been transmitted.

21. The commercial information management site of claim 19, further comprising:

a commercial list storage unit for storing a commercial list on which identifiers of available commercials stored in the commercial storage unit are listed, wherein the pay broadcast program list transmission unit reads the commercial list from the commercial list storage unit as well as the pay broadcast program list, and transmits both of the lists to the viewer' terminal that has requested the program list, the transmission request reception unit receives identifiers of commercials selected from the commercials list by the viewer's terminal, as well as the pay broadcast program identifier, and the edit unit reads commercials corresponding to the identifiers of the selected commercials from the commercial storage unit to edit a pay broadcast program with commercials, wherein the commercial information management site further includes:

a commercial selection rate calculation unit for calculating a selection rate of each commercial selected among all of the commercials, based on the identifiers of the selected commercials received by the transmission request reception unit, the commercial selection rate being provided for a commercial sponsor that provides the commercial.

22. The commercial information management site of claim 19, wherein the pay broadcast program transmission requesting unit transmits authentication information including a transmission request for the pay broadcast program, the authentication information includes a delivery form defined by a type of each viewer's terminal, the reception unit receives an authentication licensing notification together with the pay broadcast program from the pay broadcast program site; and the transmission unit transmits the pay broadcast program with commercials to the viewer's terminal that has requested the pay broadcast program according to the delivery form.

23. A viewer's terminal that is connected to a plurality of commercial information management sites which each receives a pay broadcast program from a pay broadcast program site and transmits the pay broadcast program into which commercials have been inserted to the viewer's terminal, the viewer's terminal comprising:

a pay broadcast program list requesting unit for requesting a pay broadcast program list from one of the plurality of commercial information management sites;

a list reception unit for receiving the pay broadcast program list and a commercial list from the commercial information management site or receiving identifying information on another commercial information management site from the commercial information management site;

a redemanding unit for, when the list reception unit receives the identifying information on the other commercial information management site, redemanding the pay broadcast program list from the commercial information management site identified with the received identifying information;

a display control unit for displaying, on a monitor, a broadcast program selection screen on which a plurality of titles of pay broadcast programs are listed according to the content of the pay broadcast program list, and after a viewer selects a pay broadcast program title, displaying, on the monitor, a commercial selection screen on which a plurality of identifiers of commercials are listed according to the content of the commercial list;

a transmission request transmission unit for transmitting a transmission request for the pay broadcast program, the transmission request including the title of the selected pay broadcast program and the identifiers of the selected commercials;

a reception unit for receiving the pay broadcast program with commercials; and a reproduction unit for reproducing the pay broadcast program with commercials received by the reception unit.

24. A method for transmitting/receiving a broadcast program by which commercials are inserted into a pay broadcast program to produce a pay broadcast program with commercials and the pay broadcast program with commercials is transmitted to one of a plurality of viewer's terminal, the method comprising the steps of:

receiving a transmission request for a pay broadcast program list from the viewer's terminal, the list includes titles of pay broadcast programs thereon;

transmitting the pay broadcast program list to the viewer's terminal;

receiving a request for a pay broadcast program whose title is listed on the pay broadcast program list from the viewer's terminal;

transmitting a request for the requested pay broadcast program to a pay broadcast program site;

receiving the pay broadcast program from the pay broadcast program site;

inserting one or more stored commercials into the received pay broadcast program to produce a pay broadcast program with commercials; and transmitting the pay broadcast program with commercials to the viewer's terminal, wherein the transmitting step of the pay broadcast program list includes transmitting a commercial list on which identifiers of commercials to be inserted into the pay broadcast program and points corresponding to each commercial identifier are listed, together with the pay broadcast program list, the points being given to the viewer's terminal when the viewer's terminal selecting a commercial, the receiving step of the request for the pay broadcast program includes receiving identifiers of selected commercials together with the request for the pay broadcast program request, the inserting step of commercials inserts commercials identified with the selected commercial identifiers into the pay broadcast program, wherein the method comprises the further steps of:

accumulating the number of transmitted commercials for each commercial;

calculating an advertisement fee for a commercial based on a base fee set for one point, predetermined points corresponding to the commercial, the number of times the commercial has been transmitted.

25. A method for transmitting/receiving a broadcast program by which commercials are inserted into a pay broadcast program to produce a pay broadcast program with commercials and the pay broadcast program with commercials is transmitted to one of a plurality of viewer's terminal, the method comprising the steps of:

receiving a transmission request for a pay broadcast program list from the viewer's terminal, the list includes titles of pay broadcast programs thereon;

transmitting the pay broadcast program list to the viewer's terminal;

receiving a request for a pay broadcast program whose title is listed on the pay broadcast program list from the viewer's terminal;

transmitting a request for the requested pay broadcast program to a pay broadcast program site;

receiving the pay broadcast program from the pay broadcast program site;

inserting one or more stored commercials into the received pay broadcast program to produce a pay broadcast program with commercials; and transmitting the pay broadcast program with commercials to the viewer's terminal, wherein the transmitting step of the pay broadcast program list includes transmitting a commercial list on which identifiers of commercials to be inserted into the pay broadcast program are listed, together with the pay broadcast program list, the receiving step of the request for the pay broadcast program includes receiving identifiers of selected commercials together with the request for the pay broadcast program request, the inserting step of commercials inserts commercials identified with the selected commercial identifiers into the pay broadcast program, wherein the method comprises the further steps of:

accumulating the number of transmitted commercials for each commercial; and calculating a commercial selection rate for each commercial selected among all of the commercials, based on the identifiers of the selected commercials received in the receiving step of the request for the pay broadcast program, the commercial selection rate being provided for a commercial sponsor that provides the commercial.

26. A viewer's terminal device for receiving and reproducing a pay broadcast program with commercials, comprising:

a request unit operable to request a commercial information management site to provide a pay broadcast program list;

a list reception unit operable to receive from the commercial information management site (i) the pay broadcast program list and a commercial list, or (ii) a site identifier that identifies another commercial information management site;

a re-request unit operable to, when the list reception unit receives the side identifier, request the another commercial information management site, which is indicated by the site identifier, to provide the pay broadcast program list;

a display control unit operable to (i) display, on a monitor, a program selection screen on which a plurality of pay broadcast program titles are listed according to content of the pay broadcast program list and (ii) after one or more of the pay broadcast program titles are selected, display a commercial selection screen on which a plurality of commercial identifiers are listed according to content of the commercial list;

a transmission unit operable to transmit to the commercial information management site (i) the selected pay broadcast program titles, (ii) selected commercial identifiers and (iii) a pay broadcast program transmission request;

a program reception unit operable to receive the pay broadcast program with commercials; and a reproduction unit operable to reproduce the received pay, broadcast program with commercials.

* * * * *

UNITED STATES PATENT AND TRADEMARK OFFICE
CERTIFICATE OF CORRECTION

PATENT NO. : 7,313,804 B2  Page 1 of 1
APPLICATION NO. : 10/010782
DATED : December 25, 2007
INVENTOR(S) : Kurauchi et al.

It is certified that error appears in the above-identified patent and that said Letters Patent is hereby corrected as shown below:

In Claim 3, Column 32, line 31, "viewer'" should be --viewer's--
In Claim 12, Column 34, line 59, "judgement" should be --judgment--
In Claim 14, Column 35, line 39, "judgement" should be --judgment--
In Claim 16, Column 35, line 60, "a area" should be --an area--
In Claim 16, Column 35, line 63, "judgement" should be --judgment--
In Claim 17, Column 36, line 8, "judgement" should be --judgment--
In Claim 18, Column 36, line 32, "judgement" should be --judgment--
In Claim 18, Column 36, line 44, "judgement" should be --judgment--
In Claim 18, Column 36, line 48, "judgement" should be --judgment--
In Claim 20, Column 37, line 40, "viewer'" should be --viewer's--
In Claim 21, Column 37, line 66, "viewer'" should be --viewer's--
In Claim 26, Column 40, line 43, "request the another" should be --request another--

Signed and Sealed this

Fifth Day of August, 2008

JON W. DUDAS
*Director of the United States Patent and Trademark Office*